(12) United States Patent
Meena et al.

(10) Patent No.: US 10,688,446 B2
(45) Date of Patent: Jun. 23, 2020

(54) SEAWEED POLYSACCHARIDE BASED SUPERHYDROPHILIC FOAM MEMBRANE FOR ENERGY-EFFICIENT OIL-WATER SEPARATION

(71) Applicant: COUNCIL OF SCIENTIFIC & INDUSTRIAL RESEARCH, New Delhi (IN)

(72) Inventors: Ramavatar Meena, Bhavnagar (IN); Naresh Dharmashibhai Sanandiya, Bhavnagar (IN); Jai Prakash Chaudhary, Bhavnagar (IN); Dibyendu Mondal, Bhavnagar (IN); Nataraj Sanna Kotrappanavar, Bhavnagar (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 366 days.

(21) Appl. No.: 15/029,962

(22) PCT Filed: Oct. 17, 2014

(86) PCT No.: PCT/IN2014/000658
§ 371 (c)(1),
(2) Date: Apr. 15, 2016

(87) PCT Pub. No.: WO2015/056273
PCT Pub. Date: Apr. 23, 2015

(65) Prior Publication Data
US 2016/0243505 A1    Aug. 25, 2016

(30) Foreign Application Priority Data
Oct. 17, 2013   (IN) .......................... 3079/DEL/2013

(51) Int. Cl.
   *B01D 71/08* (2006.01)
   *B01D 67/00* (2006.01)
   (Continued)

(52) U.S. Cl.
   CPC .......... *B01D 71/08* (2013.01); *B01D 17/085* (2013.01); *B01D 67/0006* (2013.01);
   (Continued)

(58) Field of Classification Search
   CPC .............. B01D 2325/36; B01D 17/085; B01D 2325/026
   See application file for complete search history.

(56) References Cited

U.S. PATENT DOCUMENTS

| 4,857,081 A | 8/1989 | Taylor |
| 4,871,461 A | 10/1989 | Karakane et al. |

(Continued)

FOREIGN PATENT DOCUMENTS

WO    WO 00/53295    9/2000

OTHER PUBLICATIONS

Pandit et al. "Multifunctional polysaccharide hydrogels for bone tissue engineering" (Tissue Eng Par A. vol. 19, 21-22: 2452-2463; published online Jul. 11, 2013) (Year: 2013).*

(Continued)

*Primary Examiner* — Ryan B Huang
(74) *Attorney, Agent, or Firm* — Norton Rose Fulbright US LLP

(57) ABSTRACT

The present invention relates to a superhydrophilic biodegradable cross linked foam membrane and a process for preparation of said foam membrane from a seaweed polysaccharides by blending with amino biopolymers/amino acids/proteins/amino compounds followed by crosslinking with a naturally occurring cross linker, genipin. The foam membrane can be used as a substitute for synthetic mem- (Continued)

brane for varied applications including membrane separation for oil-water emulsions, oil-water mixtures and other aqueous-organic mixtures under ambient conditions. These foam membranes can be recycled and reused more than three times without considerable decrease in flux rate and stability. The separation methodology of the mixtures using the foam membrane of the present invention is gravity-driven and therefore, simple and energy-efficient.

4 Claims, 8 Drawing Sheets

(51) Int. Cl.
*B01D 69/02* (2006.01)
*B01D 17/00* (2006.01)
*B01D 71/74* (2006.01)

(52) U.S. Cl.
CPC ..... *B01D 67/0083* (2013.01); *B01D 67/0095* (2013.01); *B01D 69/02* (2013.01); *B01D 71/74* (2013.01); B01D 2323/08 (2013.01); B01D 2323/10 (2013.01); B01D 2323/30 (2013.01); B01D 2325/026 (2013.01); B01D 2325/28 (2013.01); B01D 2325/36 (2013.01)

(56) References Cited

U.S. PATENT DOCUMENTS

| | | | |
|---|---|---|---|
| 4,915,834 | A | 4/1990 | Bruschke |
| 4,917,793 | A | 4/1990 | Pitt et al. |
| 5,137,633 | A | 8/1992 | Wang |
| 5,277,915 | A | 1/1994 | Provonchee et al. |
| 5,286,382 | A | 2/1994 | Scarmoutzos et al. |
| 5,334,314 | A | 8/1994 | Neel et al. |
| 5,554,414 | A | 9/1996 | Moya et al. |
| 5,698,105 | A | 12/1997 | Colquhoun et al. |
| 5,847,075 | A | 12/1998 | Colquhoun et al. |
| 6,325,218 | B1 | 12/2001 | Lee et al. |
| 6,536,605 | B2 | 3/2003 | Rice et al. |
| 7,018,538 | B2 | 3/2006 | Leiser et al. |
| 7,479,300 | B2 | 1/2009 | Koo et al. |
| 8,147,735 | B2 | 4/2012 | Buschmann |
| 8,256,626 | B2 | 9/2012 | Hubner et al. |
| 2007/0141103 | A1* | 6/2007 | Benedict ............ A61L 27/28 424/423 |

OTHER PUBLICATIONS

Pandit et al. "Evaluation of multifunctinoal polysaccharide hydrogels with varying stiffness for bone tissue engineering". Tissue Engineering Part A, vol. 19, Nos. 21 and 22, Nov. 2013, p. 2452-2463. Published online Jul. 11, 2013. (Year: 2013).*
Ahmad et al., "Water recycling from palm oil mill effluent (POME) using membrane technology", *Desalination*, 157: 87-95, 2003.
Chaudhary et al., "Bio-based superhydrophilic foam membranes for sustainable oil-water separation", *Green Chem*, 16(10): 4552-4558, 2014.
Chen et al., "The improved oil/water separation performance of cellulose acetate-graft-polyacrylonitrile membranes", *Journal of Membrane Science*, 337: 98-105, 2009.
International Search Report and Written Opinion issued in PCT/IN2014/000658, dated Mar. 25, 2015.
Kondaveeti et al., "Functional modification of agarose: A facile synthesis of a fluorescent agarose-tryptophan based hydrogel", *Carbohydrate Polymers*, 97: 165-171, 2013.
Konishi et al., "The separation of oil from an oil-water-bacteria mixture using a hydrophobic tubular membrane", *Biochemical Engineering Journal*, 24: 49-54, 2005.
Mehta et al., "Facile synthesis of agarose-L-phenylalanine ester hydrogels", *Polymer Chemistry*, 2: 2334-2340, 2011.
Pandit et al., "Evaluation of Multifunctional Polysaccharide Hydrogels with Varying Stiffness for Bone Tissue Engineering", *Tissue Engineering Part A*, 19(21-22): 2452-2463, 2013.
Panpanit et al., "Separation of oil water emulsion from car washes", *Water Science & Technology*, 41: 109-116, 2000.
Raphael et al., "Agar-based films for application as polymer electrolytes", *Electrochimica Acta*, 55: 1455-1459, 2010.
Reddy et al., "Surface modification of ultrafiltration membranes by preadsorption of a negatively charged polymer I. Permeation of water soluble polymers and inorganic salt solutions and fouling resistance properties", *Journal of Membrane Science*, 214: 211-221, 2003.
Sun et al., "Demulsification of water-in-oil emulsion by using porous glass membrane", *Journal of Membrane Science*, 146: 65-72, 1998.
Xu et al., "Effect of Polyvinylpyrrolidone Molecular Weights on Morphology, Oil/Water Separation, Mechanical and Thermal Properties of Polyetherimide/Polyvinylpyrrolidone Hollow Fiber Membranes", *Journal of Applied Polymer Science*, 74: 2220-2233, 1999.
Xu et al., "Polymeric asymmetric membranes made from polyetherimide/polybenzimidazole/poly(ethylene glycol) (PEI/PBI/PEG) for oil-surfactant-water separation", *Journal of Membrane Science*, 158: 41-53, 1999.
Xu et al., "Preparation and Characterization of Alginate Hydrogel Membranes Crosslinked Using a Water-Soluble Carbodiimide", *Journal of Applied Polymer Science*, 90: 747-753, 2003.
Yang et al., "Preparation and application in oil-water separation of $ZrO_2/\alpha-Al_2O_3$ MF membrane", *Journal of Membrane Science*, 142: 235-243, 1998.

* cited by examiner

SEAWEED POLYSACCHARIDE BASED SUPERHYDROPHILIC FOAM MEMBRANE FOR ENERGY-EFFICIENT OIL-WATER SEPARATION

CROSS-REFERENCE TO RELATED APPLICATIONS

This application is a national phase application under 35 U.S.C. § 371 of International Application No. PCT/IN2014/000658 filed 17 Oct. 2014, which claims priority to Indian Patent Application No. 3079/DEL/2013 filed 17 Oct. 2013. The entire contents of each of the above-referenced disclosures is specifically incorporated herein by reference without disclaimer.

FIELD OF THE INVENTION

The present invention relates to a sustainable super hydrophilic biodegradable hybrid foam membrane for separation of a variety of mixtures including oil-water mixtures and emulsions under ambient conditions. Particularly, the present invention relates to a biodegradable crosslinked foam membrane which is a hybrid of seaweed derived polysaccharide and amino biopolymers and/or proteins and/or amino acids/compounds having free amino groups crosslinked with genipin under ambient conditions More particularly, present invention relates to a process for the preparation of sustainable super hydrophilic crosslinked foam membranes.

BACKGROUND OF THE INVENTION

At present, different types of membranes made up of synthetic or biopolymer based materials are available which are primarily used in numerous applications such as separation of different types of mixtures including oil-water emulsion using high pressure.

Oily water emulsions are one of the main pollutants released into water by industries including Asia's largest ship breaking yard in Alang, Gujarat, India and domestic sewage. Oily water in inland waterways and coastal zone is also one of the most serious issues of water pollution which needs to be resolved urgently.

Reference may be made to "Effect of Polyvinylpyrrolidone Molecular Weights on Morphology, Oil/Water Separation, Mechanical and Thermal Properties of Polyetherimide/Polyvinylpyrrolidone Hollow Fiber Membranes" by Xu, Chung, & Huang (*Journal of Applied Polymer Science*, 74, 2220-2233, 1999) wherein a process for making polyetherimide (PEI) hollow fiber membranes using polyvinylpyrrolidones (PVP) as additives for oil/water separation has been reported.

Reference may be made to "Polymeric asymmetric membranes made from polyetherimide/polybenzimidazole/poly(ethylene glycol) (PEI/PBI/PEG) for Oil-surfactant-water separation" by Xu, Chung, Loh, & Lim (*Journal of Membrane Science*, 158 (1999) 41-53) wherein a process for making the asymmetric hollow fiber membranes using polyetherimide (PEI) as the membrane material and polybenzimidazole (PBI) and poly(ethylene glycol) (PEG 600) as the additives, for oil-surfactant-water separation.

Reference may be made to "Surface modification of ultrafiltration membranes by preadsorption of a negatively charged polymer I. Permeation of water soluble polymers and inorganic salt solutions and fouling resistance properties" by Reddy, Mohan, Bhattacharya, Shah, Ghosh (*Journal of Membrane Science* 214 (2003) 211-221) wherein a process for surface modification of Polyethersulfone ultrafiltration membranes (MWCO: 9000, 35,000 and 85,000) has been reported by preadsorption of poly(sodium 4-styrenesulfonate) (PSS) upon the permeation of aqueous solution of the polymer for about 100 min. Membranes with lower MWCO values were modified primarily on the top surface, whereas high MWCO membranes were modified both on the surface and pore walls as well.

Reference may be made to "Separation of water from hydrocarbons and halogenated hydrocarbons" by Taylor and Mich (U.S. Pat. No. 4,857,081, 1989) wherein a process for making an apparatus for separating water from a water and hydrocarbon mixture and water from a water and halogenated hydrocarbons includes membrane consisting essentially of nonporous self supported hallow fibres of cuproammonium cellulose.

Chen, Su, Zheng, Wang, Jiang (*Journal of Membrane Science* 337 (2009) 98-105) has reported the improved oil/water separation performance of cellulose acetate-graft-polyacrylonitrile membranes.

Panpanit, Visvanathan and Muttamara (Water Science & Technology, 41 (2000), 109-116) has reported the separation of oil-water emulsion from car washes by UF and NF membrane.

Reference may be made to "Demulsification of water-in-oil emulsion by using porous glass membrane" by Sun, Duan, Li, and Zhou (*Journal of Membrane Science* 146 (1998) 65-72) wherein a process for demulsification of water-in-oil emulsion by using porous glass membrane has been reported.

Yang, Zhang, Xu, Shi (*Journal of Membrane Science* 142 (1998) 235-243) has reported the preparation and application of ZrO2/a-Al2O3 MF membrane in oil-water separation.

Reference may be made to "The separation of oil from an oil-water-bacteria mixture using a hydrophobic tubular membrane" by Konishi, et al. (Biochemical Engineering Journal 24 (2005) 49-54) wherein a hydrophobic polytetrafluroethylene (PTFE) tubular membrane was effective in separating n-tetradecane, a model oil from 50% (v/v) n-tetradecane in water.

Ahmad, Ismail, and Bhatia (Desalination, 157 (2003) 87-95) have reported water recycling from palm oil mill effluent (POME) using membrane technology. Malaysia is the largest producer and exporter of palm oil. Palm oil processing is carried out in palm oil mills where oil is extracted from a palm oil fruit bunch. Large quantities of water are used during the extraction of crude palm oil from fresh fruit bunch, and about 50% of the water results in palm oil mill effluent (POME). The disposal of this highly polluting effluent is becoming a major problem if it is not treated properly according to the stringent standard limit imposed by The Malaysian Department of Environment for effluent discharged. A POME treatment system based on membrane technology shows high potential for eliminating the environmental problem, and in addition, this alternative treatment system offers water recycling. The treated effluent has high quality and crystal clear water that can be used as the boiler feed water or as a source of drinking water production.

Reference may be made to "Agar-based films for application as polymer electrolytes" by Raphael, et al. (*Electrochimica Acta* 55 (2010) 1455-1459) wherein a new types of polymer electrolytes based on agar have been prepared and characterized by impedance spectroscopy, X-ray diffraction measurements, UV-Vis spectroscopy and scanning electronic microscopy (SEM). The best ionic conductivity has been obtained for samples containing a concentration of 50 wt % of acetic acid.

Reference may be made to "Semipermeable polymers and method for producing same" by Buschmann (U.S. Pat. No. 8,147,735) wherein the patent disclosed preparation of high performance polymer membranes from aromatic polyimide membranes via thermal treating in inert atmosphere followed by crosslinking using a UV radiation source. The membranes showed significantly improved selectivity and permeability for gas separations compared to the aromatic polyimide membranes without any treatment.

Reference may be made to "Composite polyamide reverse osmosis membrane and method of producing the same" Koo, et al. (U.S. Pat. No. 7,479,300) wherein the patent disclosed preparation of a composite polyamide reverse osmosis membrane by coating a porous polysulfone support with an aqueous solution containing 2 wt % m-phenylenediamine (MPD), and 0.1 wt % di(ethylene glycol) hexyl methyl ether. The excess solution is removed, and the coated support is dipped in 0.1 wt % organic solvent solution of trimesoyl chloride (TMC) in a mixture of alkanes having from 8 to 12 carbon atoms. After draining the TMC solution off, the resulting composite membrane is air dried and then rinsed in a basic aqueous solution. The resultant membrane exhibits a flux of 21.3 gfd and a salt rejection of 98.9% when used at 225 psi for an aqueous solution containing 2000 ppm of NaCl.

Reference may be made to "Use of a composite polymer-coated sorbent for separation, purification, desalting and concentration of biopolymers" Leiser, et al. (U.S. Pat. No. 7,018,538) wherein the a composite sorbent having an at least partial coating on a support, the coating comprising essentially polyanilines or derivatives of polyanilines, said composite is used for separation, isolation, identification, purification and/or detection of biomolecules, in particular nucleic acids, proteins, polysaccharides in an analytical or preparative scale.

Reference may be made to "High performance composite membrane" Rice, et al. (U.S. Pat. No. 6,536,605) wherein said patent discloses preparation of high quality reverse osmosis, nanofiltration, and ultrafiltration membranes by employing tandem coating techniques to coat a microporous substrate with a thin membrane on the order of 25 Å to 1.0 microns. For making reverse osmosis and nanofiltration membranes, a wet-on-wet coating process was used to coat a porous substrate with an aqueous solution followed with an organic solution to produce a cross-linked and interfacially polymerized composite membrane. A single slot coating applicators was used for the preparation of ultrafiltration membranes.

Reference may be made to "Polyion complex separation membrane with a double structure" Lee, et al. (U.S. Pat. No. 6,325,218) wherein said patent discloses a polyion complex separation membrane with a double structure, which is suitable in separation of a water-soluble mixture having ionic molecules by means of reverse osmotic pressure for the purposes of recovering expensive ionic organic materials.

Membrane having anionic polymers, as substrate, is immersed into a cationic polymer solution containing a multivalent ion cross-linking agent, thereby forming an ion complex between ionic polymers of opposite ion at the surface of the separation membrane to yield a stable separation membrane of a double structure.

Reference may be made to "Polymer and porous structure" Colquhoun, et al. (U.S. Pat. No. 5,847,075) wherein said patent disclosed a polymer characterised by presence of ylid linkages in main polymer chain. They used synthetic polymers and hazardous chemical reaction to produce desired materials and said polymers may be used to fabricate membranes for various separation processes, e.g. ultrafiltration, nanofiltration, and reverse osmosis.

Reference may be made to "Polymer porous structure and process" Colquhoun, et al. (U.S. Pat. No. 5,698,105) wherein said patent disclosed a reverse osmosis membrane having a support which itself has properties of salt rejection laminated to a layer of a cross-linked polyol. The support is a sulphonated aromatic polyether sulphone, and the polyol may be polyvinyl alcohol.

Reference may be made to "Process for forming membrane having a hydrophobic fluoropolymer surface" Moya, et al. (U.S. Pat. No. 5,554,414) wherein said patent reported a composite porous object produced from a porous polymeric substrate having its entire surface modified with a cross-linked polymer. They prepared the cross-linked polymer in-situ using an ethylenically unsaturated monomer as a cross-linker.

Reference may be made to "Composition membrane for separating water from fluids containing organic components by means of pervaporation" Neel, et al. (U.S. Pat. No. 5,334,314) wherein said patent discloses preparation of composite membrane for separating water from fluid mixtures containing organic components by means of pervaporation. Composite membrane comprised a separating layer of cross-linked polyvinyl alcohol, which was subjected to a post-cross-linking by treatment with acids. The acids are preferably hydrohalic acids, sulfurous acid, sulfuric acid, nitrous acid, nitric acid or acetic acid.

Reference may be made to "Hydrophobic polymeric membrane composites" Scarmoutzos, et al. (U.S. Pat. No. 5,286,382) wherein said patent disclosed preparation of composite porous membrane from a porous polymeric substrate having its entire surface modified with a cross-linked polymer which results in a hydrophobic and oleophobic surface. The cross-linked polymer is formed in situ from a reactant system comprising an ethylenically unsaturated monomer as a cross-linker, and, used a polymerization initiator.

Reference may be made to "Hydrophobic membrane having hydrophilic and charged surface and process" Wang, D. (U.S. Pat. No. 5,137,633) wherein the surface of a hydrophobic porous substrate is modified with an interpolymeric network of a hydrophilic crosslinked polymer and a crosslinked-polyamine epichlorohydrin resin having fixed positive charges. The hydrophobic substrate is contacted with a reaction system comprising a solution of (a) monomer precursor to the hydrophilic polymer, a nonionic or cationic polymerization initiator and a crosslinking agent and (b) a precursor to the crosslinked positively charged resin. The monomer is polymerized and cross-linked by free radical polymerization followed by heating the contacted substrate to form the charged resin.

Reference may be made to "Transparent porous membrane having hydrophilic surface and process" Pitt, et al. (U.S. Pat. No. 4,917,793) wherein the preparation of a composite, microscopically transparent, porous membrane is formed from a porous polytetrafluoroethylene membrane having desired bulk properties on which a cross-linked polymer having desired surface properties is directly coated. The composite membrane retains the porosity of the porous polymeric membrane.

Reference may be made to "Multi-layer membrane and the use thereof for the separation of liquid mixtures according to the pervaporation process" Bruschke (U.S. Pat. No. 4,915,834) wherein the patent discloses the preparation of a multi-layer membrane having a porous backing layer of polyacrylonitrile, polysulfone or the like, and an active separating layer of polyvinyl alcohol or cellulose acetate. The membrane is particularly suitable for separation of water-alcohol mixtures according to the pervaporation process.

Reference may be made to "Polymer composite membrane" Karakane, et al. (U.S. Pat. No. 4,871,461) wherein the patent discloses preparation of a permeable membrane through which water or its vapor permeates selectively which contains a polyion complex formed by the association by an ionic bond between an anionic polymer and a cationic polymer on the surface of the membrane and/or in the membrane. This membrane is useful in separation of water from an aqueous solution of an organic substance or a gaseous mixture of water with an organic substance, and exhibits excellent resistance to solvent, particularly water, and a high permeation rate and a high separation coefficient.

Reference may be made to "Composite membrane for the separation of water and method for manufacturing same" Hubner, et al. (U.S. Pat. No. 8,256,626, 2012) wherein the patent discloses preparation of a composite membrane for the separation of water with at least one separation layer of cross-linked polyvinyl alcohol, with the separation layer being subjected in a separate process step to a post-crosslinking operation with an acid or an acid-releasing compound and at least one dialdehyde.

It is evident from the background that there is no document disclosing crosslinked composite prepared from seaweed polysaccharides and amino containing biopolymers which have been utilised for preparation of a hydrophobic biocompatible crosslinked porous materials which can be used for the separation of the varieties of mixtures including oil-water mixtures under gravity-gradient.

OBJECTIVE OF THE INVENTION

The main object of the present invention is to provide a hydrophilic biodegradable hybrid foam membrane for use in various applications under ambient conditions.

Yet another object of the present invention is to provide a hydrophilic biodegradable hybrid foam membrane using eco-friendly materials.

Still another object of the present invention is to provide a hydrophilic biodegradable hybrid foam membrane in a cost-effective manner.

Yet another object of the present invention is to provide a hydrophilic biodegradable hybrid foam membrane using a combination of natural polymers.

Still another object of the present invention is to provide a hydrophilic biodegradable hybrid foam membrane using a combination of seaweed polysaccharides and biopolymers with amino functionality.

Yet another object of the present invention is to provide a hydrophilic biodegradable hybrid foam membrane using a combination of seaweed polysaccharides and amino compounds.

SUMMARY OF THE INVENTION

Accordingly, the present invention provides a hydrophilic biodegradable hybrid foam membrane comprising:
a. seaweed derived polysaccharide in the range of 50 to 95 wt %;
b. an amino compound in the range of 5 to 50 wt %; and
c. a crosslinker in the range of 0.01 to 0.1 wt %
said membrane having a moisture content in the range of 5 to 15 wt %.

In an embodiment of the present invention there is provided a hydrophilic biodegradable hybrid foam membrane for use in separation of a variety of mixture including oil-water mixture and emulsions under ambient conditions at flux rate in the range of 260 to 900 $L \cdot m^{-2} \cdot h^{-1}$ and oil rejection percentage is in the range of 96 to 99%.

In another embodiment of the present invention there is provided a hydrophilic biodegradable hybrid foam memberane, wherein the seaweed derived polysaccharide is selected from the group consisting of agar, agarose and carrageenan or a combination thereof.

In yet another embodiment of the present invention there is provided a hydrophilic biodegradable hybrid foam memberane, wherein the amino compound is selected from the group consisting of gelatin, chitosan, bovine serum albumin and amino acid.

In yet another embodiment of the present invention there is provided a hydrophilic biodegradable hybrid foam memberane, wherein the crosslinker is genipin.

An embodiment of the present invention provides a process for the preparation of hydrophilic biodegradable hybrid foam membrane comprising the steps of:
[a] dissolving 0.5 to 7 wt % of a seaweed derived polysaccharide or a combination thereof in water by heating at a temperature in the range of 100 to 120° C. for a period in the range of 5 to 45 minutes to obtain a homogenous solution;
[b] adding 0.05 to 4 wt % of an amino compound dissolved in water to the homogenous solution obtained in step [a] at a temperature in the range of 40 to 85° C. under constant stirring for a period in the range of 1 to 60 minutes to obtain a reaction mixture;
[c] adding 0.01 to 1.0 wt % of the crosslinker with respect to the seaweed derived polysaccharide into the reaction mixture obtained in step [b] and keeping at temperature in the range of 25 to 80° C. for a period in the range of 20 min to 12 days to obtain a crosslinked hydrogel;
[d] slicing the crosslinked hydrogel obtained in step [c] and lyophilizing for a period in the range of 10 to 40 hours to obtain the hydrophilic biodegradable hybrid foam membrane.

In yet another embodiment of the present invention there is provided a process for the preparation of hydrophilic biodegradable hybrid foam membrane, wherein the crosslinking is done in bulk hydrogel having thickness in the range of 5 cm to 50 cm or cast in the form of a thin layer of thickness 0.2 cm to 2 cm.

In an embodiment of the present invention there is provided a process for the preparation of hydrophilic biodegradable hybrid foam membrane, wherein the seaweed derived polysaccharide is selected from the group consisting of agar, agarose, and carrageenan or a combination thereof.

In another embodiment of the present invention there is provided a process for the preparation of hydrophilic biodegradable hybrid foam membrane, wherein the amino compound is selected from the group consisting of gelatin, chitosan, bovine serum albumin and amino acid.

In another embodiment of the present invention there is provided a process for the preparation of hydrophilic biodegradable hybrid foam membrane, wherein the crosslinker is genipin.

In another embodiment of the present invention there is provided a process for the preparation of hydrophilic biodegradable hybrid foam membrane, wherein the process leads to the preparation of a stable hybrid foam membrane which is able to tolerate aqueous mixture conditions.

In still another embodiment of the present invention there is provided a process for the preparation of hydrophilic biodegradable hybrid foam membrane, wherein the process imparts stability to the foam membrane by blending naturally occurring polysaccharide with naturally occurring amino polymers or amino compounds.

In yet another embodiment of the present invention there is provided a process for the preparation of hydrophilic biodegradable hybrid foam membrane, wherein the process imparts desired mechanical stability by crosslinking the naturally occurring polysaccharide and naturally occurring amino compound with naturally occurring crosslinker, genipin.

In yet another embodiment of the present invention there is provided a process for the preparation of hydrophilic biodegradable hybrid foam membrane, wherein the hybrid foam membranes is biodegradable in soil.

In a further embodiment of the present invention, the hybrid foam membrane prepared from seaweed polymers is suitable for separation of oil-water mixtures and/or emulsions.

In another embodiment of the present invention, the hybrid foam membrane is suitable for separation of oil-water mixture.

In still another embodiment of the present invention, the hybrid foam membrane is suitable for separation of hexane-water mixture.

In yet another embodiment of the present invention, the hybrid foam membrane is suitable for separation of toluene-water mixture.

In yet another embodiment of the present invention, the hybrid foam membrane is suitable for separation of oil-spills sample from oil spill affected coastal areas.

In still another embodiment of the present invention, the hybrid foam membrane can be prepared in the form of a colored biodegradable membranes or beads.

In yet another embodiment of the present invention, the hybrid foam membrane has controlled hydrophilicity and stability from agar, agarose and carrageenan or their hybrid blend.

In still another embodiment of the present invention, the seaweed derived polysaccharide or a combination thereof is dissolved in water using microwave or conventional or autoclave heating carried out at a temperature in the range of 80 to 140 degree C. for a period of 5 to 60 minutes, more particularly for a period of 20 minutes to obtain a homogeneous solution.

In yet another embodiment of the present invention, the autoclave heating is done at a temperature in the range of 80 to 130 degree C. to dissolve the seaweed derived polysaccharide or a combination thereof for 10 to 30 min, more particularly 20 min to obtain a homogeneous solution.

In still another embodiment of the present invention, the amino compound or polymer dissolved in water is added to the homogeneous solution in the range of 0.01% to 4 wt %, more particularly 0.2 wt %, wherein said amino compound provides free amino functionality sites for crosslinking.

In yet another embodiment of the present invention, the amino compound or polymer dissolved in water is added to the homogeneous solution at a temperature in the range of 40 to 95 degree C. under constant stirring to obtain a reaction mixture.

In still another embodiment of the present invention, the naturally occurring crosslinker is added to the reaction mixture in the range of 0.01 to 0.2 wt %, more particularly 0.04 wt %.

In yet another embodiment of the present invention, the naturally occurring crosslinker is added to the reaction mixture at a temperature in the range of 40 to 95 degree Celsius under stirring for crosslinking of the polymers present in the reaction mixture, more particularly at 50 degree Celsius.

In yet another embodiment of the present invention, the naturally occurring crosslinker is added to the reaction mixture at a temperature in the range of 40 to 95 degree Celsius under stirring, and kept at room temperature (20 to 35° C.) for crosslinking between the polymers present in the reaction mixture for 20 minutes to 12 days under ambient conditions.

In yet another embodiment of the present invention, the biodegradable hybrid foam membrane is free from fouling under cross flow experimental conditions.

In yet another embodiment of the present invention, the biodegradable hybrid foam membrane is suitable for membrane separation without external stimuli such as pressure.

In still another embodiment of the present invention, the quality and performance of the recycled biodegradable hybrid foam membrane is almost similar even after five to ten cycles of oil-water separation.

In yet another embodiment of the present invention, the biodegradable hybrid foam membrane is easy to dispose off in open environment.

DETAILED DESCRIPTION OF THE INVENTION

The seaweed derived phycocolloids used for the purposes of the present invention are selected from agar bacteriological (product code: 0140132), agarose (product code 014011) and alginate (product code: 1947295) which were commercially procured from M/s Sisco Research Laboratories (SRL) Pvt. Ltd. Mumbai—400 093, Maharashtra, India, and semi refined carrageenan (product code: Aqua gel 250) which was commercially procured from M/s Aquagri Processing Pvt. Ltd., New Delhi, India.

Figure 1A:
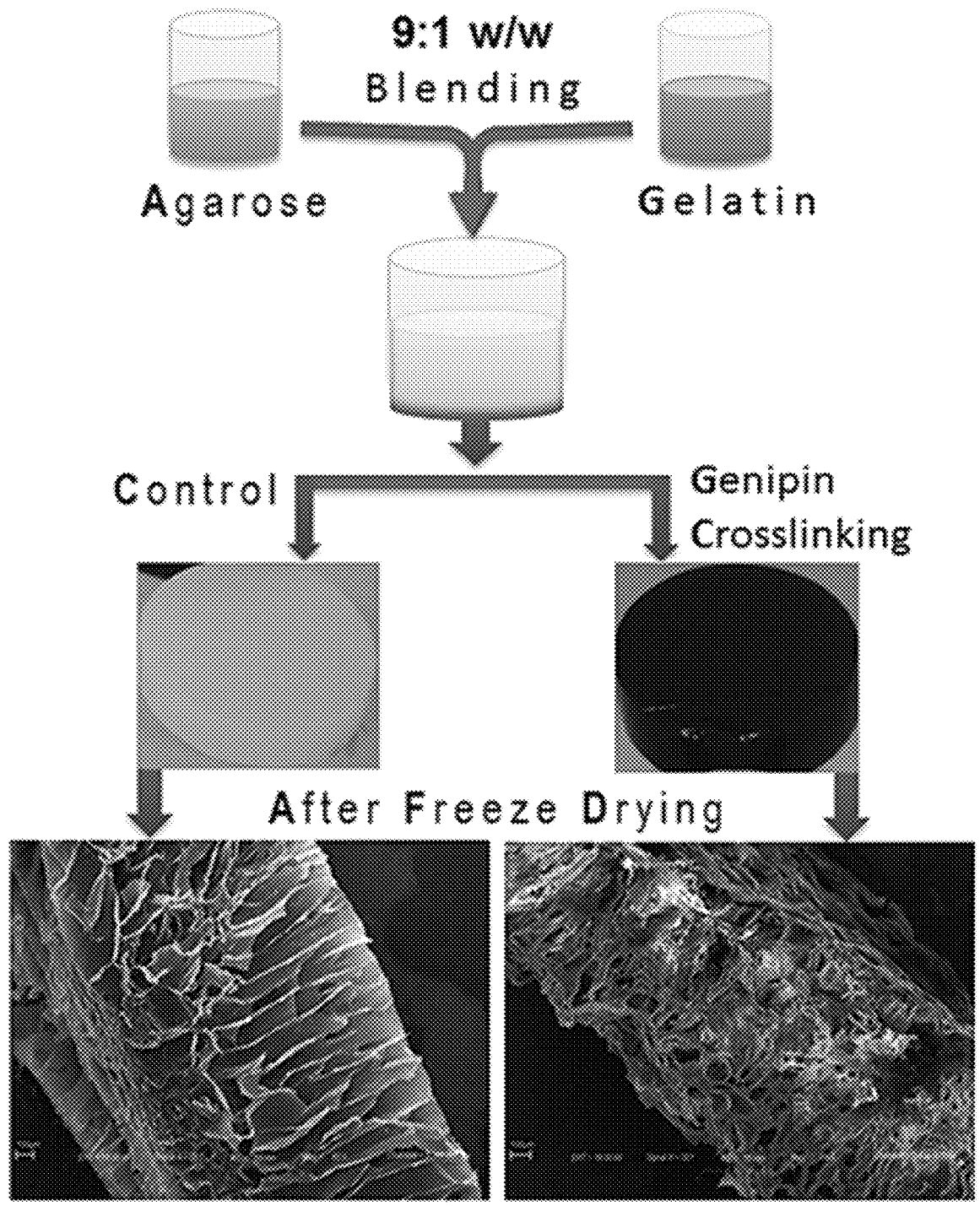
FIG. 1A illustrates schematically representation of the process for preparation of biodegradable hybrid foam membrane.
Figure 1B:
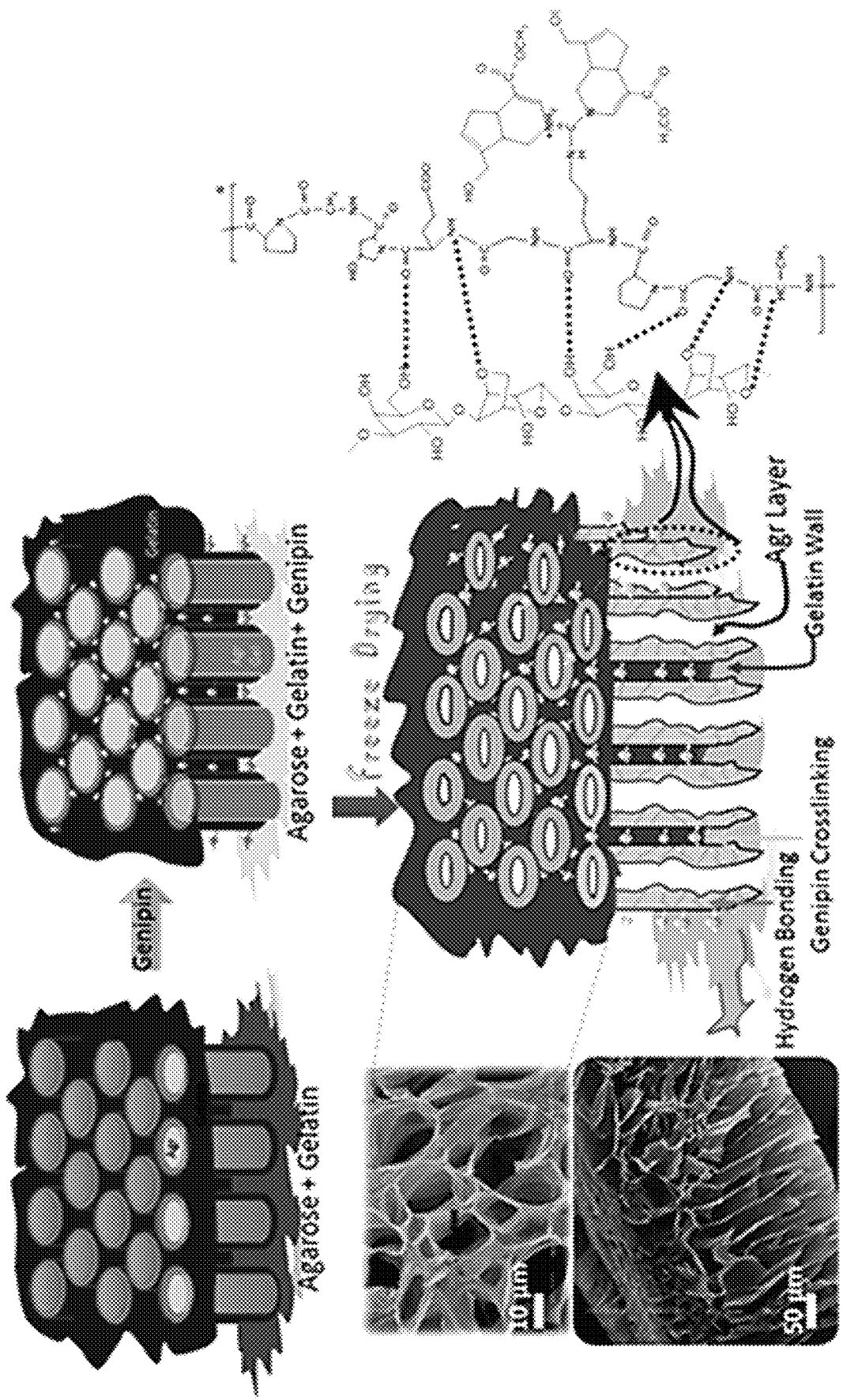
FIG. 1B illustrates the crosslinking between the agarose and gelatine by genipin before and after lyophilisation.
Figure 2:
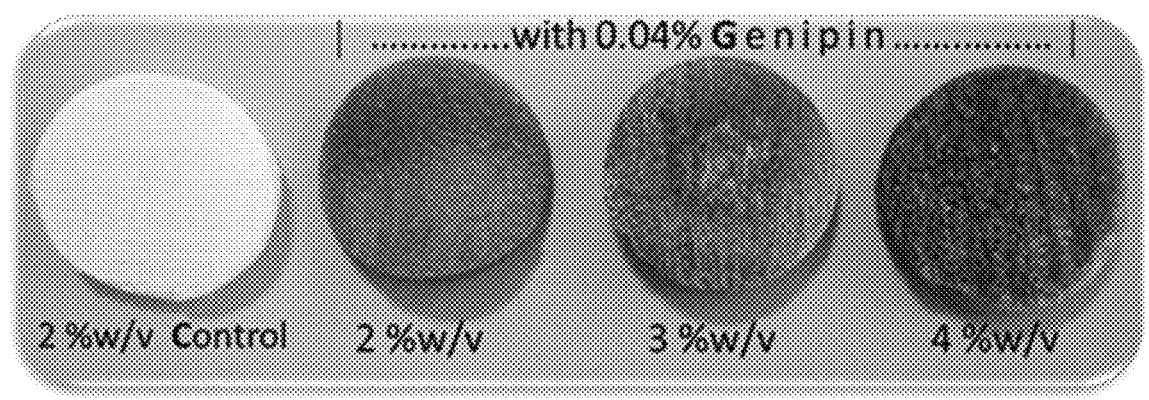
FIG. 2 illustrates photographic images of the hybrid foam membrane, first sample from left as control, second to fourth sample as cross-linked agarose and gelatine with different blend concentrations.
Figure 3A:
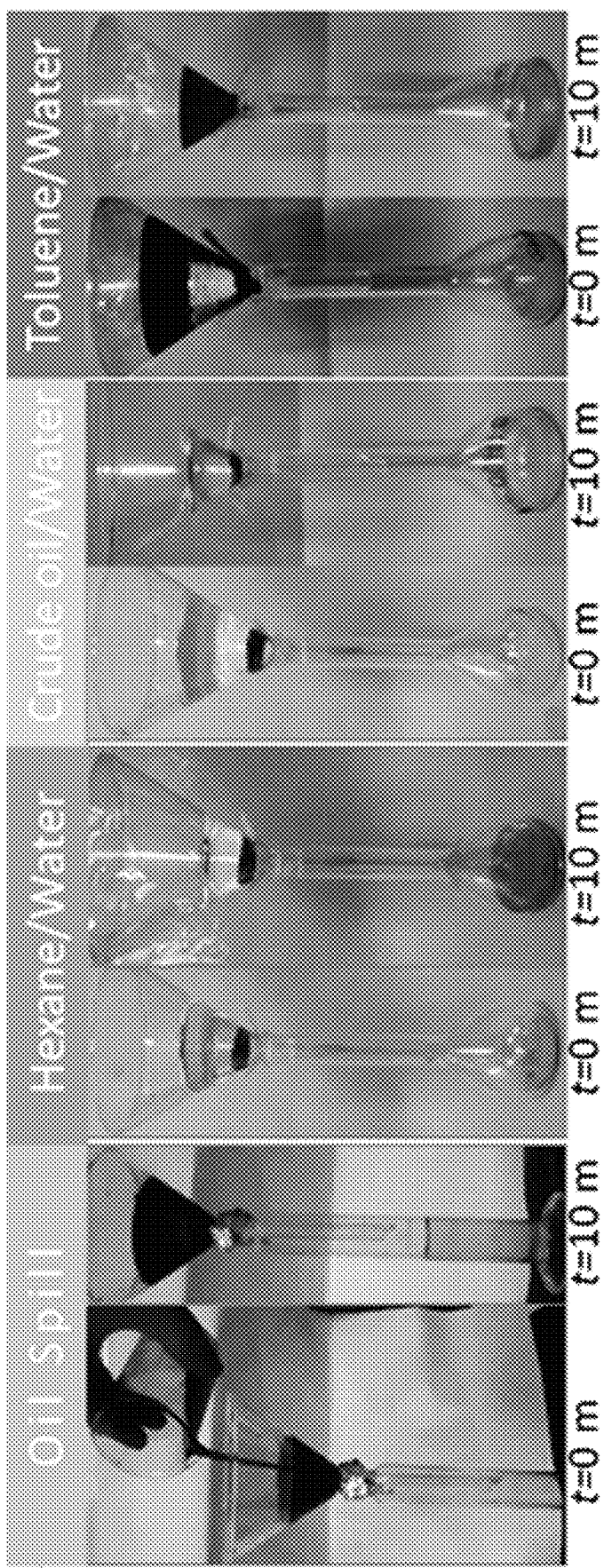
FIG. 3A illustrates a gravity-driven oil-water separation apparatus with 50:50 (v:v) of different oil-water mixtures.
Figure 3B:
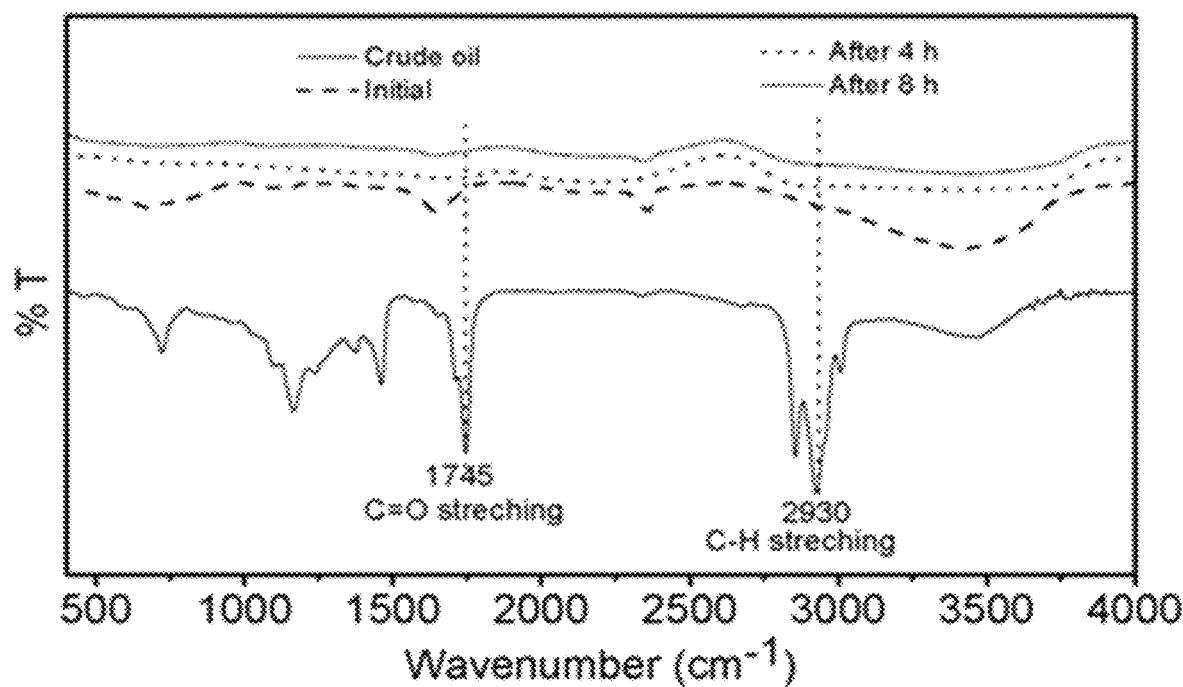
FIG. 3B shows the FTIR characterization of crude oil to evaluate separation performance of feed and permeate samples, disappearance of the characteristic peaks for C=O of esters and C—H stretching of oils confirms the purity of permeate.
Figure 3C:
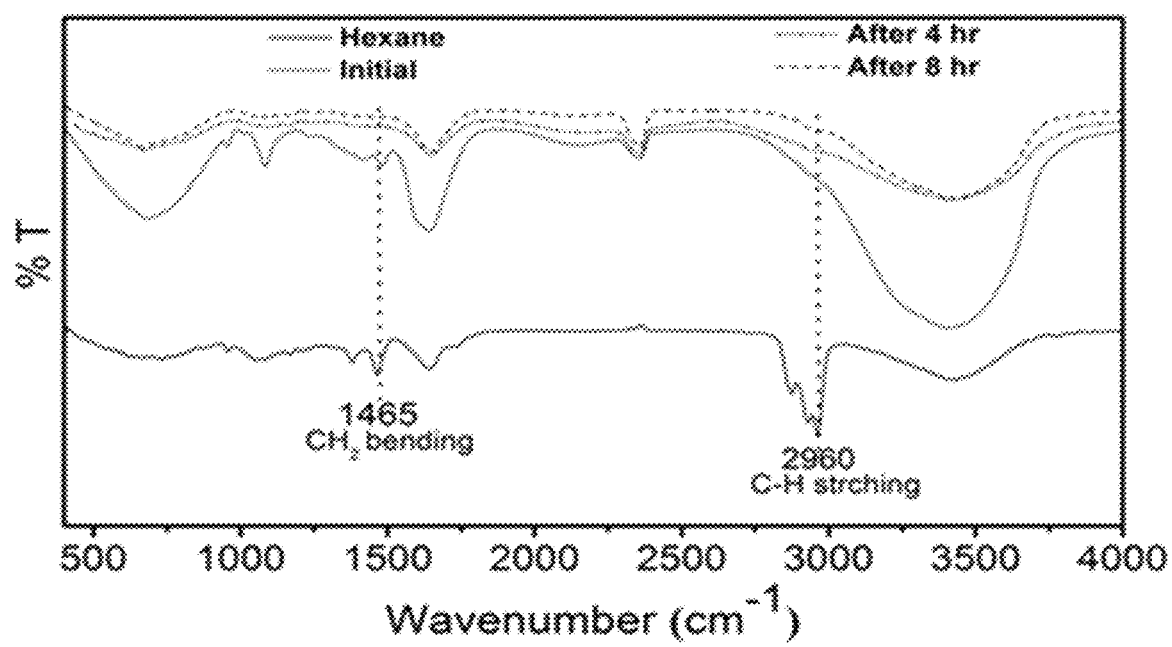
FIG. 3C shows the FTIR characterization of hexane to evaluate separation performance of feed and permeate samples, disappearance of the characteristic peaks for C=O of esters and C—H stretching of oils confirms the purity of permeate, FIG. 3D displays the permeate flux (L m$^{-2}$ h$^{-1}$) and % rejection of various oil-water mixtures.
Figure 3D:
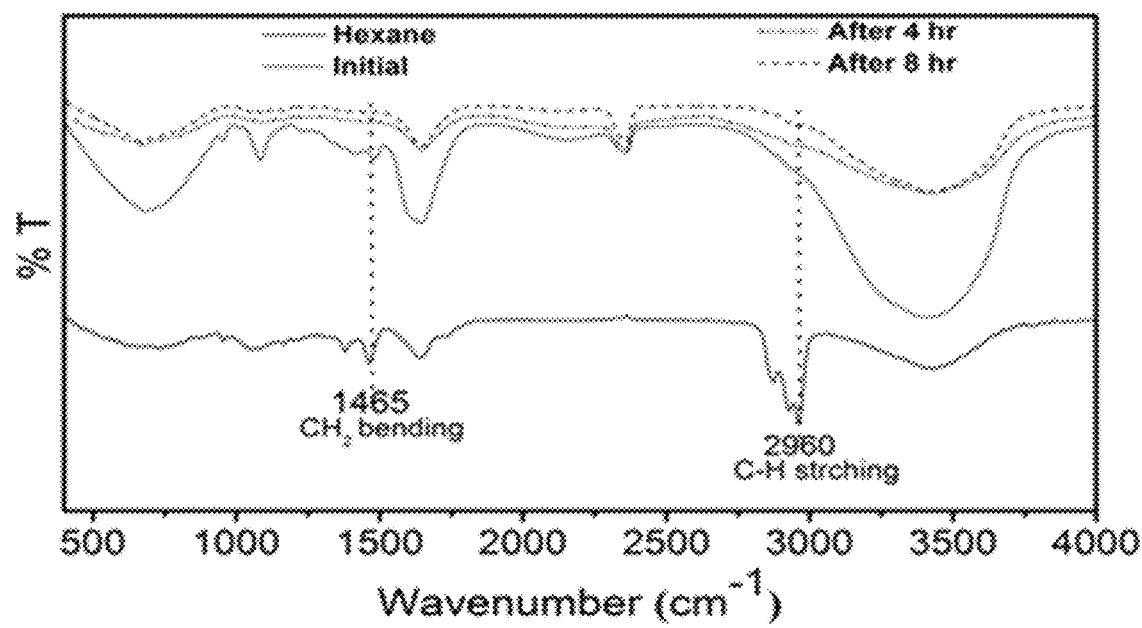

The present invention relates to biodegradable superhydrophilic foam membranes exhibiting high mechanical stability and good flexibility. The present invention also describes a simple, eco-friendly and one-step crosslinking for the preparation of said foam membrane materials from the seaweed derived polysaccharides and amino polymers/compounds blends through crosslinking reaction with naturally occurring crosslinker like genipin (FIG. 1). The process comprising: dissolving 0.5 to 7 wt % of the seaweed derived polysaccharides or combination thereof in water by heating at 100 to 120° C. for 5 to 45 minutes to obtain a homogenous solution; adding 0.05 to 4 wt % amino polymers or compounds in the homogenous solution at 40 to 85° C. under constant stirring for 1 to 60 min to obtain a reaction mixture and then followed by addition of 0.01 to 1.0 wt % (with respect to seaweed polysaccharides) of the crosslinker, genipin into the reaction mixture and keeping at room temperature (25° C.) for 20 min to 12 days to obtain the crosslinked hydrogels; slicing the crosslinked hydrogel at a temperature of 25 to 40 degree C. and lyophilizing for a period of 10 to 40 hours to yield the hydrophilic biodegradable hybrid foam membrane suitable for multifarious applications including oil-water separations under gravity driven force.

The invention relates to the preparation of hydrophilic biodegradable hybrid foam membranes from natural polymers such as seaweed polysaccharides through blending with amino natural polymers or amino compounds followed by crosslinking reaction with naturally occurring crosslinker. The developed crosslinked hydrogel can be moulded in the form of foam membranes, beads etc., which can be used as a substitute for synthetic membrane separation for varied applications including oil-water mixtures and emulsions. The results of separation experiments showed that the prepared hybrid foam membranes are suitable for separation of oil-water under ambient conditions at atmospheric pressure, and yield ca. <98% purity of water. These foam membranes are very flexible and easy to handle. These foam membranes are suitable for recovery and reuse for more than six times without considerable change in the performance. In addition, foam membranes can also be used for the separation of oil-spills, crude oil-water, hexane-water, toluene-water, etc. under ambient conditions.

EXAMPLES

Following examples are given by way of illustration and therefore should not be construed to limit the scope of the invention.

Example 1

1900 mg agarose was dissolved in 75 ml distilled water by heating at 100 degree Celsius for 15 min under microwave/autoclave conditions. 100 mg gelatin was dissolved in 25 ml distilled water under ambient conditions, and was added in to agarose solution under stirring condition at 50 degree Celsius followed by the addition of 40 mg naturally occurring crosslinker genipin, and gradually cooled to room temperature (25° C.) to form a hydrogel. After 10 min, the colour of the whole solution started changing from a transparent solution to light blue in colour due to cross-linking, and the resultant hydrogel was left for 10 days at room temperature (25° C.) to allow crosslinking reaction. After that, crosslinked hydrogel was cut to 0.4 mm thick slices and lyophilized at a freeze-drying temperature of −85° C. under vacuum to obtain porous foam membranes (FIG. 1). The foam membrane was flexible, spongy with high water uptake capacity, and less stabile under experimental conditions. Recycling and washing are not proper. Water was separate out from oil-water mixture with 300 L m$^{-2}$ h$^{-1}$ flux with ~96% purity.

No weight loss on washing with water and organic solvents (e.g. etanol, methasnol, ios-Propanol, acetone) is observed from the final freeze-dried product indicates that most of the reactants amount presence in the crosslinked product after completion of crosslinking reaction, and yield of the final crosslinked foam membrane matter is almost the same of the total quantities of the reactants (e.g. agarose, gelatin and crosslinker) used in the crosslinking reaction at initial stage. Hence the compositions of the products are purely based of the initial weights of the reactants used in this invention.

Example 2

1800 mg agarose was dissolved in 75 ml distilled water by heating at 100 degree Celsius for 20 min under microwave/autoclave conditions. 200 mg gelatin was dissolved in 25 ml distilled water under ambient conditions, and was added in agarose solution under stirring condition at 70 degree Celsius followed by the addition of 40 mg naturally occurring crosslinker genipin, and gradually cooled to room temperature (25° C.) to form a hydrogel. After 10 min, the colour of the whole solution started changing from a transparent solution to light blue in colour due to cross-linking, and the resultant hydrogel was left for 10 days at room (25° C.) temperature to allow for complete crosslinking reaction. After that, crosslinked hydrogel was cut to 0.4 mm thick slices and lyophilized at a freeze-drying temperature of −85° C. under vacuum to obtain porous foam membranes. The foam membrane was flexible, spongy and having negligible water uptake capacity. Easy to recycle and reuse through simple washing and performance was identical after five cycles. Separation performance for the various solvent systems has been given in the Table 1 (FIG. 2 and FIG. 3A-3D).

TABLE 1

Flux rate dependency on the type of solvent mixtures.

| Type of mixture | Flux rate (L.m$^{-2}$ · h$^{-1}$) | % Oil rejection |
| --- | --- | --- |
| Oil spill | 420 | 99.0 |
| Crude oil-water | 510 | 97.5 |
| Edible oil-water | 530 | 98.0 |
| Hexane-water | 560 | 97.0 |
| Toluene-water | 500 | 99.0 |

Example 3

Figure 4:
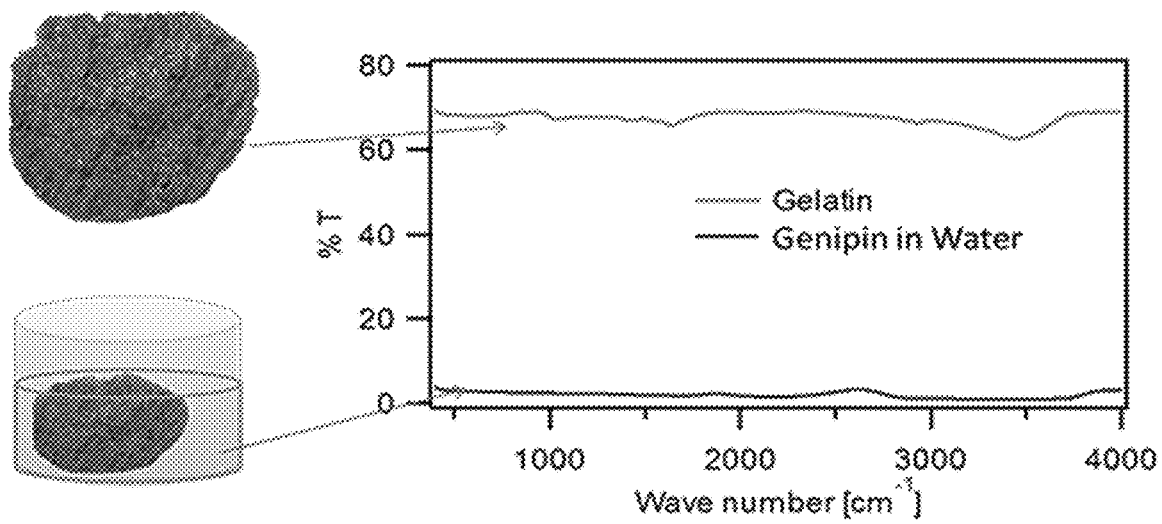
FIG. 4 illustrates genipin leach-out study conducted prior to testing.

1700 mg agarose was dissolved in 75 ml distilled water by heating at 100 degree Celsius for 10 min under microwave/ autoclave conditions. 300 mg gelatin was dissolved in 25 ml distilled water under ambient conditions, and was added in agarose solution under stirring condition at 60 degree Celsius followed by the addition of 40 mg naturally occurring crosslinker genipin, and gradually cooled to room temperature (25° C.) to form a hydrogel. After 10 min, the colour of the whole solution started changing from a transparent solution to light blue in colour due to cross-linking, and the resultant hydrogel was left for 10 days at room temperature (25° C.) to allow for complete crosslinking reaction. After that, crosslinked hydrogel was cut to 0.4 mm thick slices and lyophilized at a freeze-drying temperature of −85° C. under vacuum to obtain porous foam membranes. The foam membrane was flexible, spongy with high water uptake capacity, and less stabile under experimental conditions. Recycling and washing are not proper. Water was separate out from oil-water mixture with 350 L m$^{-2}$ h$^{-1}$ flux with ~94% purity. Slightly color leaching was observed (FIG. 4).

Membranes were extensively characterised for their characteristic changes and crosslinking of genipin in the network. $^1$H NMR spectrum of gelatin (Gel) exhibited characteristics peaks at δ 7.83 and 8.05 ppm. No peaks at 7.83 and 8.05 ppm are observed in the NMR spectrum of the crosslinked product (Agarose-Gelatin-Genipin or Agr+Gel+Gen) after crosslinking confirmed the crosslinking of genipin with gelatin.

Example 4

1500 mg agarose was dissolved in 75 ml distilled water by heating at 100 degree Celsius for 35 min under microwave/autoclave conditions. 500 mg gelatin was dissolved in 25 ml distilled water under ambient conditions, and was added in agarose solution under stirring condition at 80 degree Celsius followed by the addition of 40 mg naturally occurring crosslinker genipin, and gradually cooled to room temperature (25° C.) to form a hydrogel. After 10 min, the colour of the whole solution started changing from a transparent solution to light blue in colour due to cross-linking, and the resultant hydrogel was left for 10 days at room temperature (25° C.) to allow for complete crosslinking reaction. After that, crosslinked hydrogel was cut to 0.4 mm thick slices and lyophilized at a freeze-drying temperature of −85° C. under vacuum to obtain porous foam membranes. The foam membrane was flexible, spongy with high water uptake capacity, and less stabile under experimental conditions. Recycling and washing are not proper. Separation was not proper on this foam membrane, as leaching of gelatin was observed.

Example 5

1000 mg agarose was dissolved in 75 ml distilled water by heating at 100 degree Celsius for 5 min under microwave/autoclave conditions. 1000 mg gelatin was dissolved in 25 ml distilled water under ambient conditions, and was added in agarose solution under stirring condition at 40 degree Celsius followed by the addition of 40 mg naturally occurring crosslinker genipin, and gradually cooled to room temperature (25° C.) to form a hydrogel. After 10 min, the colour of the whole solution started changing from a transparent solution to light blue in colour due to cross-linking, and the resultant hydrogel was left for 10 days at room temperature (25° C.) to allow for complete crosslinking reaction. After that, crosslinked hydrogel was cut to 0.4 mm thick slices and lyophilized at a freeze-drying temperature of −85° C. under vacuum to obtain porous foam membranes. The foam membrane was flexible, spongy with high water uptake capacity, and less stabile under experimental conditions. Recycling and washing are not proper and collapsed during aqueous contact. Separation was not proper on this foam membrane, as leaching of gelatin was observed.

Example 6

Figure 5A:
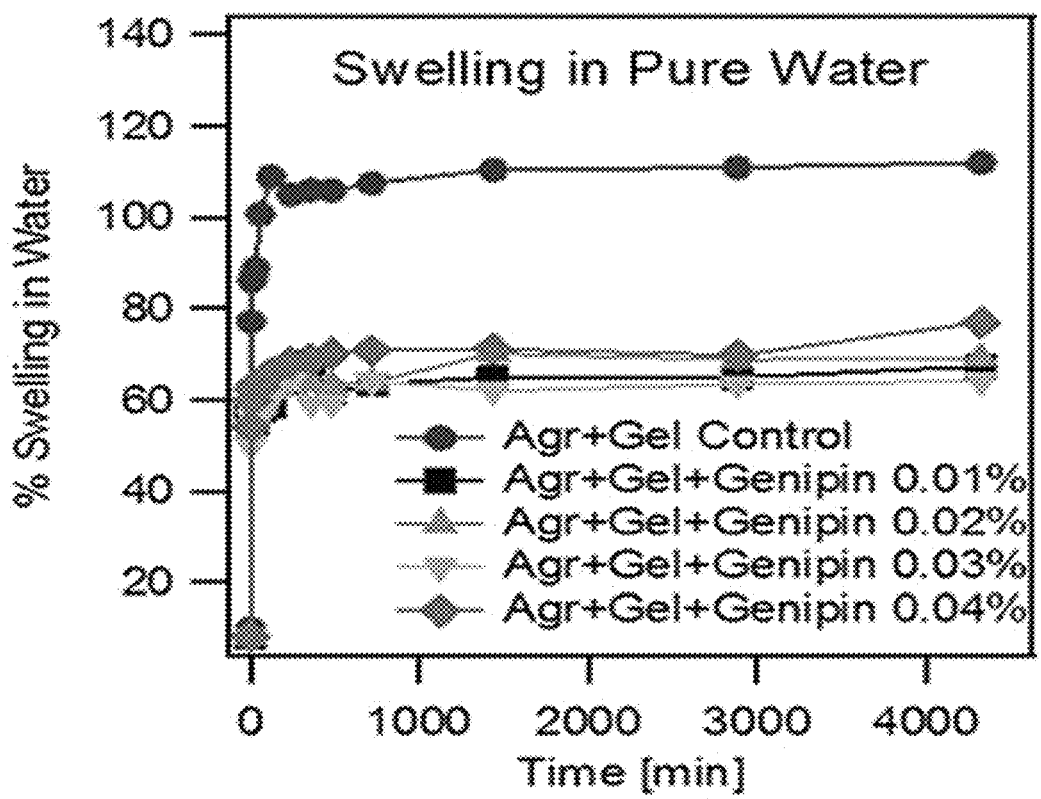
FIG. 5A illustrates swelling studies conducted on different foam membrane to confirm their water uptake capacities in pure water.
Figure 5B:
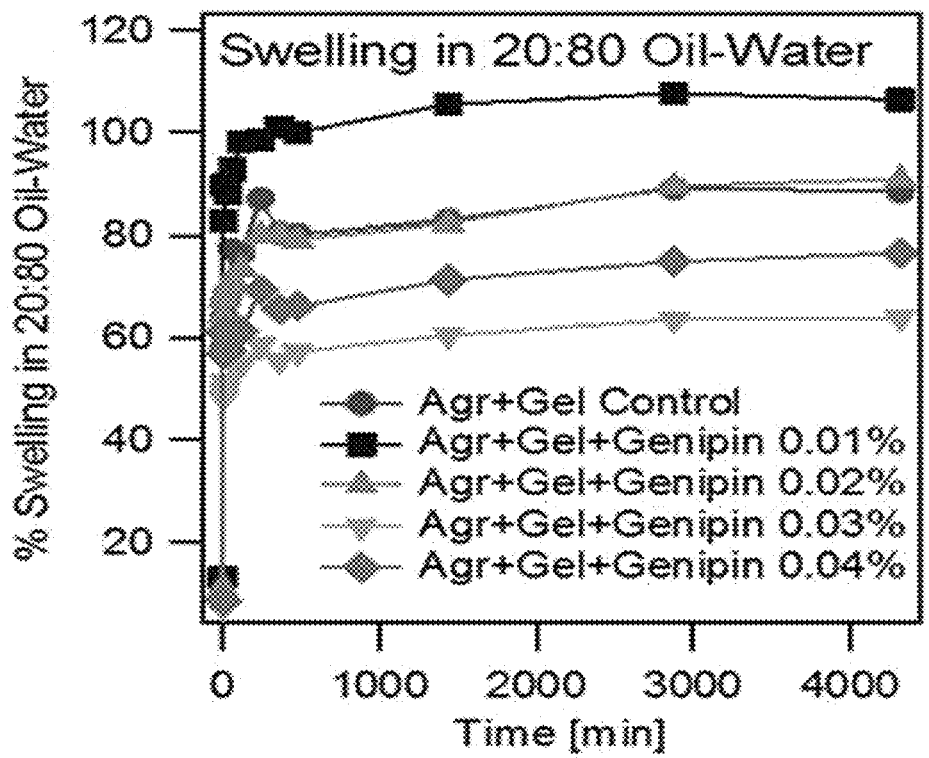
FIG. 5B illustrates swelling studies conducted on different foam membrane to confirm their water uptake capacities in oil-water mixtures.

1800 mg agarose was dissolved in 75 ml distilled water by heating at 100 degree Celsius for 40 min under microwave/autoclave conditions. 200 mg gelatin was dissolved in 25 ml distilled water under ambient conditions, and was added in agarose solution under stirring condition at 85 degree Celsius followed by the addition of 10 mg naturally occurring crosslinker genipin, and gradually cooled to room temperature (25° C.) to form a hydrogel. After 120 min, the colour of the whole solution started changing from a transparent solution to light blue in colour due to cross-linking, and the resultant hydrogel was left for 10 days at room temperature (25° C.) to allow for crosslinking reaction. After that, crosslinked hydrogel was cut to 0.4 mm thick slices and lyophilized at a freeze-drying temperature of −85° C. under vacuum to obtain porous foam membranes. The crosslinking was not complete and resulting foam membrane was flexible, spongy with high water uptake capacity (FIG. 5), and less stabile under experimental conditions. Recycling and washing are not proper. Separation was not proper on this foam membrane, as leaching of colour was observed.

Example 7

1800 mg agarose was dissolved in 75 ml distilled water by heating at 100 degree Celsius for 25 min under microwave/autoclave conditions. 200 mg gelatin was dissolved in 25 ml distilled water under ambient conditions, and was added in agarose solution under stirring condition at 70 degree Celsius followed by the addition of 20 mg naturally occurring crosslinker genipin, and gradually cooled to room temperature (25° C.) to form a hydrogel. After 10 min, the colour of the whole solution started changing from a transparent solution to light blue in colour due to cross-linking, and the resultant hydrogel was left for 10 days at room temperature (25° C.) to allow for complete crosslinking reaction. After that, crosslinked hydrogel was cut to 0.4 mm thick slices and lyophilized at a freeze-drying temperature of −85° C. under vacuum to obtain porous foam membranes. The crosslinking was not complete and resulting foam membrane was flexible, spongy with high water uptake capacity, and less stabile under experimental conditions. Recycling and washing are not proper. Separation was not proper on this foam membrane, as leaching of color was observed.

Example 8

1800 mg agarose was dissolved in 75 ml distilled water by heating at 100 degree Celsius for 45 min under microwave/autoclave conditions. 200 mg gelatin was dissolved in 25 ml distilled water under ambient conditions, and was added in agarose solution under stirring condition at 70 degree Celsius followed by the addition of 30 mg naturally occurring crosslinker genipin, and gradually cooled to room temperature (25° C.) to form a hydrogel. After 10 min, the colour of the whole solution started changing from a transparent solution to light blue in colour due to cross-linking, and the resultant hydrogel was left for 10 days at room temperature (25° C.) to allow for complete crosslinking reaction. After that, crosslinked hydrogel was cut to 0.4 mm thick slices and lyophilized at a freeze-drying temperature of −85° C. under vacuum to obtain porous foam membranes. The crosslinking was not complete and resulting foam membrane was flexible, spongy with high water uptake capacity, and less stabile under experimental conditions. Recycling and washing are possible but color leaching was observed.

Example 9

Figure 6:
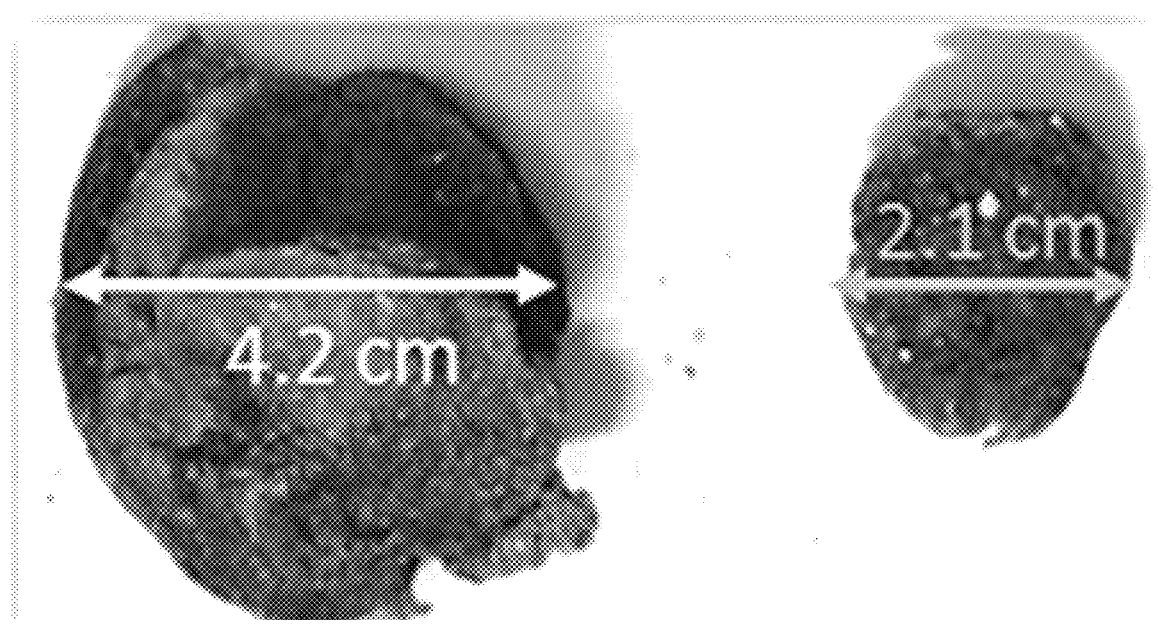
FIG. 6 illustrates biodegradability of the hybrid foam membrane under soil conditions.

1800 mg agarose was dissolved in 75 ml distilled water by heating at 100 degree Celsius for 20 min under microwave/autoclave conditions. 200 mg gelatin was dissolved in 25 ml distilled water under ambient conditions, and was added in agarose solution under stirring condition at 70 degree Celsius followed by the addition of 60 mg naturally occurring crosslinker genipin, and gradually cooled to room temperature (25° C.) to form a hydrogel. After 7 min, the colour of the whole solution started changing from a transparent solution to light blue in colour due to cross-linking, and the resultant hydrogel was left for 10 days at room temperature (25° C.) to allow for complete crosslinking reaction. The crosslinking reaction was homogeneous throughout the hydrogel mass. After that, crosslinked hydrogel was cut to 0.4 mm thick slices and lyophilized at a freeze-drying temperature of −85° C. under vacuum to obtain porous foam membranes. The resulting membrane was less flexible, spongy, and washable with negligible water uptake capacity. Membrane was recycled more than five times and performance was almost identical up to five cycles with ~350 L $m^{-2}$ $h^{-1}$ continuous flux with ~98% pure product water. Foam membranes have soil degradability under environmental conditions (FIG. 6).

Example 10

1800 mg agarose was dissolved in 75 ml distilled water by heating at 100 degree Celsius for 25 min under microwave/autoclave conditions. 200 mg gelatin was dissolved in 25 ml distilled water under ambient conditions, and was added in agarose solution under stirring condition at 70 degree Celsius followed by the addition of 100 mg naturally occurring crosslinker genipin, and gradually cooled to room temperature (25° C.) to form a hydrogel. After 5 min, the colour of the whole solution started changing from a transparent solution to light blue in colour due to cross-linking, and the resultant hydrogel was left for 10 days at room temperature (25° C.) to allow for complete crosslinking reaction. After that, crosslinked hydrogel was cut to 0.4 mm thick slices and lyophilized at a freeze-drying temperature of −85° C. under vacuum to obtain porous foam membranes. The resulting membrane was less flexible, spongy, and washable with negligible water uptake capacity. Membrane was recycled more than five times and performance was almost identical up to five cycles with 440 L $m^{-2}$ $h^{-1}$ continuous flux with ~98% pure product water.

Example 11

1800 mg agarose was dissolved in 75 ml distilled water by heating at 100 degree Celsius for 25 min under microwave/autoclave conditions. 200 mg gelatin was dissolved in 25 ml distilled water under ambient conditions, and was added in agarose solution under stirring condition at 70 degree Celsius followed by the addition of 40 mg naturally occurring crosslinker genipin, and gradually cooled to room temperature (25° C.) to form a hydrogel. After 10 min, the colour of the whole solution started changing from a transparent solution to light blue in colour due to cross-linking, and the resultant hydrogel was left for 2 days at room temperature (25° C.) to allow for crosslinking reaction. After that, crosslinked hydrogel was cut to 0.4 mm thick slices and lyophilized at a freeze-drying temperature of −85° C. under vacuum to obtain porous foam membranes. The resulting membrane was flexible, spongy, and unstable under experimental conditions with high water uptake capacity. Membrane was collapsed during separation experiments and color leaching was observed.

Example 12

1800 mg agarose was dissolved in 75 ml distilled water by heating at 100 degree Celsius for 10 min under microwave/autoclave conditions. 200 mg gelatin was dissolved in 25 ml distilled water under ambient conditions, and was added in agarose solution under stirring condition at 70 degree Celsius followed by the addition of 40 mg naturally occurring crosslinker genipin, and gradually cooled to room temperature (25° C.) to form a hydrogel. After 10 min, the colour of the whole solution started changing from a transparent solution to light blue in colour due to cross-linking, and the resultant hydrogel was left for 5 days at room temperature (25° C.) to allow for crosslinking reaction. After that, crosslinked hydrogel was cut to 0.4 mm thick slices and lyophilized at a freeze-drying temperature of −85° C. under vacuum to obtain porous foam membranes. The resulting membrane was flexible, spongy, and unstable under experimental conditions with high water uptake capacity, and color leaching was observed.

Example 13

1800 mg agarose was dissolved in 75 ml distilled water by heating at 100 degree Celsius for 20 min under microwave/autoclave conditions. 200 mg gelatin was dissolved in 25 ml distilled water under ambient conditions, and was added in agarose solution under stirring condition at 70 degree Celsius followed by the addition of 40 mg naturally occurring crosslinker genipin, and gradually cooled to room temperature (25° C.) to form a hydrogel. After 10 min, the colour of the whole solution started changing from a transparent solution to light blue in colour due to cross-linking, and the resultant hydrogel was left for 7 days at room temperature (25° C.) to allow for crosslinking reaction. After that, crosslinked hydrogel was cut to 0.4 mm thick slices and lyophilized at a freeze-drying temperature of −85° C. under vacuum to obtain porous foam membranes. The resulting membrane was flexible, spongy, and stable under experimental conditions with low water uptake capacity. Membrane was used for separation and flux rate was 500 L $m^{-2}$ $h^{-1}$, but recycling was proper up to two cycles.

Example 14

1800 mg agarose was dissolved in 75 ml distilled water by heating at 100 degree Celsius for 25 min under microwave/autoclave conditions. 200 mg gelatin was dissolved in 25 ml distilled water under ambient conditions, and was added in agarose solution under stirring condition at 70 degree Celsius followed by the addition of 40 mg naturally occurring crosslinker genipin, and gradually cooled to room temperature (25° C.) to form a hydrogel. After 7 min, the colour of the whole solution started changing from a transparent solution to light blue in colour due to cross-linking, and the resultant hydrogel was left for 12 days at room temperature (25° C.) to allow for complete crosslinking reaction. The crosslinking reaction was homogeneous throughout the hydrogel mass. After that, crosslinked hydrogel was cut to 0.4 mm thick slices and lyophilized at a freeze-drying temperature of −85° C. under vacuum to obtain porous foam membranes. The resulting membrane was flexible, spongy, and washable with negligible water uptake capacity. Membrane was recycled more than five times and performance was almost identical up to five cycles with 490 L m$^{-2}$ h$^{-1}$ continuous flux with ~98% pure product water.

Example 15

2700 mg agarose was dissolved in 75 ml distilled water by heating at 100 degree Celsius for 40 min under microwave/autoclave conditions. 300 mg gelatin was dissolved in 25 ml distilled water under ambient conditions, and was added in agarose solution under stirring condition at 70 degree Celsius followed by the addition of 40 mg naturally occurring crosslinker genipin, and gradually cooled to room temperature (25° C.) to form a hydrogel. After 10 min, the colour of the whole solution started changing from a transparent solution to light blue in colour due to cross-linking, and the resultant hydrogel was left for 12 days at room temperature (25° C.) to allow for crosslinking reaction. After that, crosslinked hydrogel was cut to 0.4 mm thick slices and lyophilized at a freeze-drying temperature of −85° C. under vacuum to obtain porous foam membranes. The resulting membrane was considerably rigid, brittle, with high water uptake capacity. Foam membrane was not homogeneous and purity of water product was 70% along with color leaching.

Example 16

3600 mg agarose was dissolved in 75 ml distilled water by heating at 100 degree Celsius for 45 min under microwave/autoclave conditions. 400 mg gelatin was dissolved in 25 ml distilled water under ambient conditions, and was added in agarose solution under stirring condition at 70 degree Celsius followed by the addition of 40 mg naturally occurring crosslinker genipin, and gradually cooled to room temperature (25° C.) to form a hydrogel. After 10 min, the colour of the whole solution started changing from a transparent solution to light blue in colour due to cross-linking, and the resultant hydrogel was left for 15 days at room temperature (25° C.) to allow for crosslinking reaction. After that, crosslinked hydrogel was cut to 0.4 mm thick slices and lyophilized at a freeze-drying temperature of −85° C. under vacuum to obtain porous foam membranes. The resulting membrane was rigid, brittle, with high water uptake capacity. Foam membrane was not homogeneous and no separation experiments were performed. Color leaching was observed during aqueous contact.

Example 17

4500 mg agarose was dissolved in 75 ml distilled water by heating at 100 degree Celsius for 40 min under microwave/autoclave conditions. 500 mg gelatin was dissolved in 25 ml distilled water under ambient conditions, and was added in agarose solution under stirring condition at 70 degree Celsius followed by the addition of 40 mg naturally occurring crosslinker genipin, and gradually cooled to room temperature (25° C.) to form a hydrogel. After 10 min, the colour of the whole solution started changing from a transparent solution to light blue in colour due to cross-linking, and the resultant hydrogel was left for 15 days at room temperature (25° C.) to allow for crosslinking reaction. After that, crosslinked hydrogel was cut to 0.4 mm thick slices and lyophilized at a freeze-drying temperature of −85° C. under vacuum to obtain porous foam membranes. The resulting membrane was very rigid, brittle and with high water uptake capacity. Foam membrane was not homogeneous and no separation experiments were performed. Color leaching was observed during aqueous contact.

Examples 1 to 17 thought us that best quality foam membranes were obtained with 2 wt % total polymer concentration having 0.2 wt % gelatin, 0.04 wt % crosslinker concentration and crosslinking time is 10 days under ambient conditions.

Example 18

450 mg agarose was dissolved in 75 ml distilled water by heating at 100 degree Celsius for 10 min under microwave/autoclave conditions. 50 mg chitosan was dissolved in 25 ml distilled water under ambient conditions, and was added in agarose solution under stirring condition at 70 degree Celsius followed by the addition of 40 mg naturally occurring crosslinker genipin, and gradually cooled to room temperature (25° C.) to form a hydrogel. After 10 min, the colour of the whole solution started changing from a transparent solution to light blue in colour due to cross-linking, and the resultant hydrogel was left for 2 days at room temperature (25° C.) to allow for complete crosslinking reaction. After that, crosslinked hydrogel was cut to 0.4 mm thick slices and lyophilized at a freeze-drying temperature of −85° C. under vacuum to obtain porous foam membranes. The crosslinked hydrogel was weak and slicing of gel was not suitable.

Example 19

900 mg agarose was dissolved in 75 ml distilled water by heating at 100 degree Celsius for 10 min under microwave/autoclave conditions. 100 mg chitosan was dissolved in 25 ml distilled water under ambient conditions, and was added in to agarose solution under stirring condition at 70 degree Celsius followed by the addition of 40 mg naturally occurring crosslinker genipin, and gradually cooled to room temperature (25° C.) to form a hydrogel. After 10 min, the colour of the whole solution started changing from a transparent solution to light blue in colour due to cross-linking, and the resultant hydrogel was left for 2 days at room temperature (25° C.) to allow crosslinking reaction. After that, crosslinked hydrogel was cut to 0.4 mm thick slices and lyophilized at a freeze-drying temperature of −85° C. under vacuum to obtain porous foam membranes.

Membranes were extensively characterised for their characteristic changes and crosslinking of genipin with amino groups. UV spectra of chitosan and agarose does not exhibit any absorption peaks in the UV spectra, while crosslinker genipin showed characteristic peak at 240 nm. The appearance of the new peaks at 282 nm and 600 nm confirmed the crosslinking of genipin with amino moieties of chitosan. Hereafter, UV spectrum of the crosslinked product agarose-Chitosan-Genipin (Agr+CH+Gen) confirmed use of amino groups in the crosslinking with genipin.

The foam membrane was flexible, spongy with negligible water uptake capacity, and stabile under experimental conditions. Easy to recycle and wash. Water was separate out from oil-water mixture with 750 L m$^{-2}$ h$^{-1}$ flux with ~97% purity. The performance was identical up to three cycles.

TABLE 2

Flux rate dependency on the type of solvent mixtures.

| Type of mixture | Flux rate (L.m$^{-2}$ · h$^{-1}$) | % Oil rejection | Remarks |
|---|---|---|---|
| Oil spill | 770 | 98.0 | Reuse three times |
| Crude oil-water | 700 | 97.5 | Reuse three times |
| Edible oil-water | 730 | 98.0 | Reuse three times |
| Hexane-water | — | — | Separation was not proper |
| Toluene-water | 700 | 97.0 | Reuse three times |

Example 20

1800 mg agarose was dissolved in 75 ml distilled water by heating at 100 degree Celsius for 20 min under microwave/autoclave conditions. 200 mg chitosan was dissolved in 25 ml distilled water under ambient conditions, and was added in agarose solution under stirring condition at 70 degree Celsius followed by the addition of 40 mg naturally occurring crosslinker genipin, and gradually cooled to room temperature (25° C.) to form a hydrogel. After 10 min, the colour of the whole solution started changing from a transparent solution to light blue in colour due to cross-linking, and the resultant hydrogel was left for 2 days at room temperature (25° C.) to allow for complete crosslinking reaction. After that, crosslinked hydrogel was cut to 0.4 mm thick slices and lyophilized at a freeze-drying temperature of −85° C. under vacuum to obtain porous foam membranes. The foam membrane was flexible, spongy and having negligible water uptake capacity. Easy to recycle and reuse through simple washing and performance was identical up to three cycles. Water was separate out from oil-water mixture with 700 L m$^{-2}$ h$^{-1}$ flux with ~98% purity.

No weight loss on washing with water and organic solvents (e.g. etanol, methasnol, ios-Propanol, acetone) is observed from the final freeze-dried product indicates that most of the reactants amount presence in the crosslinked product after completion of crosslinking reaction, and yield of the final crosslinked foam membrane matter is almost the same of the total quantities of the reactants (e.g. agarose, chitosan/BSA and crosslinker) used in the crosslinking reaction at initial stage. Hence the compositions of the products are purely based of the initial weights of the reactants used in this invention.

Example 21

500 mg agarose was dissolved in 75 ml distilled water by heating at 100 degree Celsius for 30 min under microwave/autoclave conditions. 500 mg chitosan was dissolved in 25 ml distilled water under ambient conditions, and was added in agarose solution under stirring condition at 70 degree Celsius followed by the addition of 40 mg naturally occurring crosslinker genipin, and gradually cooled to room temperature (25° C.) to form a hydrogel. After 10 min, the colour of the whole solution started changing from a transparent solution to light blue in colour due to cross-linking, and the resultant hydrogel was left for 2 days at room temperature (25° C.) to allow for complete crosslinking reaction. After that, crosslinked hydrogel was cut to 0.4 mm thick slices and lyophilized at a freeze-drying temperature of −85° C. under vacuum to obtain porous foam membranes. The foam membrane was not homogeneous, spongy with low water uptake capacity, and stabile under experimental conditions. Water was separate out from oil-water mixture with 450 L m$^{-2}$ h$^{-1}$ flux with ~92% purity.

Example 22

900 mg agarose was dissolved in 75 ml distilled water by heating at 100 degree Celsius for 5 min under microwave/autoclave conditions. 100 mg chitosan was dissolved in 25 ml distilled water under ambient conditions, and was added in agarose solution under stirring condition at 70 degree Celsius followed by the addition of 10 mg naturally occurring crosslinker genipin, and gradually cooled to room temperature (25° C.) to form a hydrogel. After 10 min, the colour of the whole solution started changing from a transparent solution to light blue in colour due to cross-linking, and the resultant hydrogel was left for 2 days at room temperature (25° C.) to allow for crosslinking reaction. After that, crosslinked hydrogel was cut to 0.4 mm thick slices and lyophilized at a freeze-drying temperature of −85° C. under vacuum to obtain porous foam membranes. The crosslinking was not complete and resulting foam membrane was flexible, spongy with high water uptake capacity, and less stabile under experimental conditions. Recycling and washing are not proper. Separation was not proper on this foam membrane.

Example 23

900 mg agarose was dissolved in 75 ml distilled water by heating at 100 degree Celsius for 15 min under microwave/autoclave conditions. 100 mg chitosan was dissolved in 25 ml distilled water under ambient conditions, and was added in agarose solution under stirring condition at 70 degree Celsius followed by the addition of 20 mg naturally occurring crosslinker genipin, and gradually cooled to room temperature (25° C.) to form a hydrogel. After 10 min, the colour of the whole solution started changing from a transparent solution to light blue in colour due to cross-linking, and the resultant hydrogel was left for 2 days at room temperature (25° C.) to allow for complete crosslinking reaction. After that, crosslinked hydrogel was cut to 0.4 mm thick slices and lyophilized at a freeze-drying temperature of −85° C. under vacuum to obtain porous foam membranes. The crosslinking was not complete and resulting foam membrane was flexible, spongy with high water uptake capacity, and less stabile under experimental conditions. Recycling and washing are not proper. Separation was not proper on this foam membrane.

Example 24

900 mg agarose was dissolved in 75 ml distilled water by heating at 100 degree Celsius for 10 min under microwave/autoclave conditions. 100 mg chitosan was dissolved in 25 ml distilled water under ambient conditions, and was added in agarose solution under stirring condition at 70 degree Celsius followed by the addition of 30 mg naturally occurring crosslinker genipin, and gradually cooled to room temperature (25° C.) to form a hydrogel. After 10 min, the colour of the whole solution started changing from a transparent solution to light blue in colour due to cross-linking, and the resultant hydrogel was left for 2 days at room temperature (25° C.) to allow for complete crosslinking reaction. After that, crosslinked hydrogel was cut to 0.4 mm thick slices and lyophilized at a freeze-drying temperature of −85° C. under vacuum to obtain porous foam membranes. The crosslinking was not complete and resulting foam membrane was flexible, spongy with high water uptake capacity, and less stabile under experimental conditions.

Example 25

900 mg agarose was dissolved in 75 ml distilled water by heating at 100 degree Celsius for 40 min under microwave/autoclave conditions. 100 mg chitosan was dissolved in 25 ml distilled water under ambient conditions, and was added in agarose solution under stirring condition at 70 degree Celsius followed by the addition of 50 mg naturally occurring crosslinker genipin, and gradually cooled to room temperature (25° C.) to form a hydrogel. After 7 min, the colour of the whole solution started changing from a transparent solution to light blue in colour due to cross-linking, and the resultant hydrogel was left for 2 days at room temperature (25° C.) to allow for complete crosslinking reaction. The crosslinking reaction was homogeneous throughout the hydrogel mass. After that, crosslinked hydrogel was cut to 0.4 mm thick slices and lyophilized at a freeze-drying temperature of −85° C. under vacuum to obtain porous foam membranes. The resulting membrane was flexible, spongy, and washable with negligible water uptake capacity. Membrane was recycled more than three times and performance was almost identical up to three cycles with 700 L m$^{-2}$ h$^{-1}$ continuous flux with ~98% pure product water.

CP-MAS $^{13}$C NMR (solid NMR) spectrum of agarose shows characteristics peaks: δ 62.66, 70.02, 76.08, 80.02, 98.43 and 102.18 ppm; and solid NMR spectrum of chitosan exhibited characteristics peaks: δ 23.38, 57.32, 61.0, 75.29, 82.91, 105.06 and 174.39 ppm. The solid NMR spectrum of crosslinked product Agarose-Chitosan-Genipin shows most of the characteristics peaks of agarose and chitosan in the range of 23-173.43 ppm along with the characteristics peaks of genipin at δ 111.88, 133.61, 152.72 and 166.20 ppm indicates crosslinking and insertion of genipin in the crosslinked product.

Example 26

900 mg agarose was dissolved in 75 ml distilled water by heating at 100 degree Celsius for 20 min under microwave/autoclave conditions. 100 mg chitosan was dissolved in 25 ml distilled water under ambient conditions, and was added in agarose solution under stirring condition at 70 degree Celsius followed by the addition of 60 mg naturally occurring crosslinker genipin, and gradually cooled to room temperature (25° C.) to form a hydrogel. After 5 min, the colour of the whole solution started changing from a transparent solution to light blue in colour due to cross-linking, and the resultant hydrogel was left for 2 days at room temperature (25° C.) to allow for complete crosslinking reaction. After that, crosslinked hydrogel was cut to 0.4 mm thick slices and lyophilized at a freeze-drying temperature of −85° C. under vacuum to obtain porous foam membranes. The resulting membrane was less flexible, and washable. Membrane was recycled more than five times and performance was almost identical up to three cycles with 650 L m$^{-2}$ h$^{-1}$ continuous flux with ~98% pure product water.

FTIR spectrum of agarose exhibited characteristics IR bands including peak at 932 cm$^{-1}$ (due to 3, 6-anhydrogalactose linkage). IR spectrum of chitosan also shows characteristic peaks at 3352 cm$^{-1}$ (—OH groups), 2878 cm$^{-1}$ (—CH$_3$ groups), 1560 (N—H group bending vibration) and 1404 cm$^{-1}$ typical of the vibrations of —OH group of the primary alcoholic group, respectively. In addition, chitosan shows the bands at 1320 and 1077 cm$^{-1}$ correspond to the stretching of C—O—N and C—O groups. The appearance of the characteristics peaks of agarose (at 1162, 1076 and 932 cm$^{-1}$) and chitosan (at 1560, 1320, 1154, 1077 and 897 cm$^{-1}$) with slight broadening or shifting and/or with varied intensities in the FTIR spectrum of the crosslinked product confirms the presence of both agarose and chitosan in the crosslinked products and crosslinking. Significant decreases in absorbance were also observed for the various peaks along with a new peak appeared at about 1630 cm$^{-1}$ after the reaction of crosslinking also indicates crosslinking. In addition, noticeable change appeared in the shift of broader Agarose stretching peak (OH) at ~3438 cm$^{-1}$ upon blending with chitosan (~3435 cm$^{-1}$) to ~3400 cm$^{-1}$, and this remained unchanged upon genipin crosslinking. Therefore, hydroxyl (OH) groups present in agarose make hydrogen bonding interaction with chitosan resulting in lamellar structures in which chitosan holding agarose either side. So, it leads to confirm that superhydrophilic agarose micro-pore is surrounded by chitosan walls used for selective separation from oil-water emulsions.

Example 27

900 mg agarose was dissolved in 75 ml distilled water by heating at 100 degree Celsius for 25 min under microwave/autoclave conditions. 100 mg chitosan was dissolved in 25 ml distilled water under ambient conditions, and was added in agarose solution under stirring condition at 70 degree Celsius followed by the addition of 40 mg naturally occurring crosslinker genipin, and gradually cooled to room temperature (25° C.) to form a hydrogel. After 10 min, the colour of the whole solution started changing from a transparent solution to light blue in colour due to cross-linking, and the resultant hydrogel was left for 3 days at room temperature (25° C.) to allow for crosslinking reaction. After that, crosslinked hydrogel was cut to 0.4 mm thick slices and lyophilized at a freeze-drying temperature of −85° C. under vacuum to obtain porous foam membranes. The resulting membrane was less flexible, and washable. Membrane was recycled more than five times and performance was almost identical up to three cycles with 700 L m$^{-2}$ h$^{-1}$ continuous flux with ~98% pure product water.

Example 28

900 mg agarose was dissolved in 75 ml distilled water by heating at 100 degree Celsius for 35 min under microwave/autoclave conditions. 100 mg chitosan was dissolved in 25 ml distilled water under ambient conditions, and was added in agarose solution under stirring condition at 70 degree Celsius followed by the addition of 40 mg naturally occurring crosslinker genipin, and gradually cooled to room temperature (25° C.) to form a hydrogel. After 10 min, the colour of the whole solution started changing from a transparent solution to light blue in colour due to cross-linking, and the resultant hydrogel was left for 5 days at room temperature (25° C.) to allow for crosslinking reaction. After that, crosslinked hydrogel was cut to 0.4 mm thick slices and lyophilized at a freeze-drying temperature of −85° C. under vacuum to obtain porous foam membranes. The resulting membrane was less flexible, and washable. Membrane was recycled more than five times and performance was almost identical up to three cycles with 650 L m$^{-2}$ h$^{-1}$ continuous flux with ~98% pure product water.

Example 29

2700 mg agarose was dissolved in 75 ml distilled water by heating at 100 degree Celsius for 40 min under microwave/ autoclave conditions. 300 mg chitosan was dissolved in 25 ml distilled water under ambient conditions, and was added in agarose solution under stirring condition at 70 degree Celsius followed by the addition of 40 mg naturally occurring crosslinker genipin, and gradually cooled to room temperature (25° C.) to form a hydrogel. After 7 min, the colour of the whole solution started changing from a transparent solution to light blue in colour due to cross-linking, and the resultant hydrogel was left for 2 days at room temperature (25° C.) to allow for complete crosslinking reaction. The crosslinking reaction was homogeneous throughout the hydrogel mass. The crosslinked hydrogel was not homogeneous and slicing was not proper. After that, crosslinked hydrogel was cut to 0.4 mm thick slices and lyophilized at a freeze-drying temperature of −85° C. under vacuum to obtain porous foam membranes. The resulting membrane was also not homogeneous and was not used for separation experiments.

Examples 18 to 29 thought us that best quality foam membranes were obtained with 1 wt % total polymer concentration having 0.1 wt % chitosan, 0.04 wt % crosslinker concentration and crosslinking time is 2 days under ambient conditions.

Example 30

1800 mg agarose was dissolved in 75 ml distilled water by heating at 100 degree Celsius for 10 min under microwave/autoclave conditions. 200 mg Bovine Serum albumin (BSA) was dissolved in 25 ml distilled water under ambient conditions, and was added in agarose solution under stirring condition at 70 degree Celsius followed by the addition of 40 mg naturally occurring crosslinker genipin, and gradually cooled to room temperature (25° C.) to form a hydrogel. After 10 min, the colour of the whole solution started changing from a transparent solution to light blue in colour due to cross-linking, and the resultant hydrogel was left for 10 days at room temperature (25° C.) to allow for complete crosslinking reaction. After that, crosslinked hydrogel was cut to 0.4 mm thick slices and lyophilized at a freeze-drying temperature of −85° C. under vacuum to obtain porous foam membranes. The resulting membrane was flexible, spongy, and washable. Membrane was recycled more than three times and performance was almost identical up to three cycles with 850 L m$^{-2}$ h$^{-1}$ continuous flux with ~97% pure product water.

TABLE 3

Flux rate dependency on the type of solvent mixtures.

| Type of mixture | Flux rate (L.m$^{-2}$ · h$^{-1}$) | % Oil rejection | Remarks |
| --- | --- | --- | --- |
| Oil spill | 850 | 98 | Reuse three times |
| Crude oil-water | 900 | 98 | Reuse three times |
| Edible oil-water | 840 | 98 | Reuse three times |
| Hexane-water | — | — | Separation was not proper |
| Toluene-water | 830 | 97 | Reuse three times |

Example 31

1800 mg agarose was dissolved in 75 ml distilled water by heating at 100 degree Celsius for 20 min under microwave/autoclave conditions. 200 mg Bovine Serum albumin (BSA) was dissolved in 25 ml distilled water under ambient conditions, and was added in agarose solution under stirring condition at 85 degree Celsius followed by the addition of 40 mg naturally occurring crosslinker genipin, and gradually cooled to room temperature (25° C.) to form a hydrogel. After 10 min, the colour of the whole solution started changing from a transparent solution to light blue in colour due to cross-linking, and the resultant hydrogel was left for 12 days at room temperature (25° C.) to allow for complete crosslinking reaction. After that, crosslinked hydrogel was cut to 0.4 mm thick slices and lyophilized at a freeze-drying temperature of −85° C. under vacuum to obtain porous foam membranes. The resulting membrane was flexible, spongy, and suitable for separation experiments.

TABLE 4

Flux rate dependency on the type of solvent mixtures.

| Type of mixture | Flux rate (L.m$^{-2}$ · h$^{-1}$) | % Oil rejection | Remarks |
| --- | --- | --- | --- |
| Oil spill | 800 | 99 | Reuse three times |
| Crude oil-water | 850 | 99 | Reuse three times |
| Edible oil-water | 780 | 99 | Reuse three times |
| Hexane-water | — | — | Separation was not proper |
| Toluene-water | 800 | 98 | Reuse three times |

Example 32

900 mg agarose was dissolved in 75 ml distilled water by heating at 100 degree Celsius for 40 min under microwave/autoclave conditions. 100 mg Bovine Serum albumin (BSA) was dissolved in 25 ml distilled water under ambient conditions, and was added in agarose solution under stirring condition at 60 degree Celsius followed by the addition of 40 mg naturally occurring crosslinker genipin, and gradually cooled to room temperature (25° C.) to form a hydrogel. After 10 min, the colour of the whole solution started changing from a transparent solution to light blue in colour due to cross-linking, and the resultant hydrogel was left for 12 days at room temperature (25° C.) to allow for complete crosslinking reaction. After that, crosslinked hydrogel was cut to 0.4 mm thick slices and lyophilized at a freeze-drying temperature of −85° C. under vacuum to obtain porous foam membranes. The resulting membrane was flexible, spongy, but not suitable for separation experiments. Colour leaching was observed in aqueous solutions.

Example 33

2700 mg agarose was dissolved in 75 ml distilled water by heating at 100 degree Celsius for 25 min under microwave/autoclave conditions. 300 mg Bovine Serum albumin (BSA) was dissolved in 25 ml distilled water under ambient conditions, and was added in agarose solution under stirring condition at 70 degree Celsius followed by the addition of 40 mg naturally occurring crosslinker genipin, and gradually cooled to room temperature (25° C.) to form a hydrogel. After 10 min, the colour of the whole solution started changing from a transparent solution to light blue in colour due to cross-linking, and the resultant hydrogel was left for 12 days at room temperature (25° C.) to allow for complete crosslinking reaction. After that, crosslinked hydrogel was cut to 0.4 mm thick slices and lyophilized at a freeze-drying temperature of −85° C. under vacuum to obtain porous foam membranes. The resulting membrane was flexible, spongy, but not suitable for separation experiments. Colour leaching was observed in aqueous solutions.

Example 34

1800 mg agarose was dissolved in 75 ml distilled water by heating at 100 degree Celsius for 30 min under microwave/autoclave conditions. 200 mg phenylalanine was dissolved in 25 ml distilled water under ambient conditions, and was added in agarose solution under stirring condition at 70 degree Celsius followed by the addition of 40 mg naturally occurring crosslinker genipin, and gradually cooled to room temperature (25° C.) to form a hydrogel. After 10 min, the colour of the whole solution started changing from a transparent solution to light blue in colour due to cross-linking, and the resultant hydrogel was left for 12 days at room temperature (25° C.) to allow for complete crosslinking reaction. After that, crosslinked hydrogel was cut to 0.4 mm thick slices and lyophilized at a freeze-drying temperature of −85° C. under vacuum to obtain porous foam membranes. The resulting membrane was flexible, spongy, and suitable for separation experiments. Membrane was recycled more than three times and performance was almost identical up to three cycles.

TABLE 5

Flux rate dependency on the type of solvent mixtures.

| Type of mixture | Flux rate ($L.m^{-2} \cdot h^{-1}$) | % Oil rejection | Remarks |
| --- | --- | --- | --- |
| Oil spill | 520 | 98 | Reuse three times |
| Crude oil-water | 500 | 98 | Reuse three times |
| Edible oil-water | 530 | 98 | Reuse three times |
| Hexane-water | — | — | Separation was not proper |
| Toluene-water | 450 | 97 | Reuse three times |

Example 35

1800 mg agarose was dissolved in 75 ml distilled water by heating at 100 degree Celsius for 20 min under microwave/autoclave conditions. 200 mg BSA was dissolved in 25 ml distilled water under ambient conditions, and was added in agarose solution under stirring condition at 70 degree Celsius followed by the addition of 40 mg naturally occurring crosslinker genipin. Heat at 80 degree Celsius for 20 min on hot plate then gradually cooled to room (25° C.) temperature to form a hydrogel. After that, crosslinked hydrogel was cut to 0.4 mm thick slices and lyophilized at a freeze-drying temperature of −85° C. under vacuum to obtain porous foam membranes. The resulting membrane was flexible, spongy, and suitable for separation experiments. Membrane was recycled more than two times and performance was almost identical up to two cycles.

TABLE 5

Flux rate dependency on the type of solvent mixtures.

| Type of mixture | Flux rate ($L.m^{-2} \cdot h^{-1}$) | % Oil rejection | Remarks |
| --- | --- | --- | --- |
| Oil spill | 330 | 97 | Reuse two times |
| Crude oil-water | 320 | 97 | Reuse two times |
| Edible oil-water | 340 | 98 | Reuse two times |
| Toluene-water | 300 | 97 | Reuse two times |

Example 36

1800 mg agarose was dissolved in 75 ml distilled water by heating at 100 degree Celsius for 30 min under microwave/autoclave conditions. 200 mg BSA was dissolved in 25 ml distilled water under ambient conditions, and was added in agarose solution under stirring condition at 80 degree Celsius followed by the addition of 40 mg naturally occurring crosslinker genipin. After that heat at 80 degree Celsius for 120 min on hot plate then gradually cooled to room (25° C.) temperature to form a hydrogel. After that, crosslinked hydrogel was cut to 0.4 mm thick slices and lyophilized at a freeze-drying temperature of −85° C. under vacuum to obtain porous foam membranes. The resulting membrane was flexible, spongy, and suitable for separation experiments.

TABLE 5

Flux rate dependency on the type of solvent mixtures.

| Type of mixture | Flux rate ($L.m^{-2} \cdot h^{-1}$) | % Oil rejection | Remarks |
| --- | --- | --- | --- |
| Oil spill | 370 | 97 | Not reuse |
| Crude oil-water | 410 | 98 | Not reuse |
| Edible oil-water | 380 | 98 | Not reuse |
| Toluene-water | 340 | 97 | Not reuse |

Example 37

1800 mg agarose was dissolved in 75 ml distilled water by heating at 100 degree Celsius for 30 min under microwave/autoclave conditions. 200 mg BSA was dissolved in 25 ml distilled water under ambient conditions, and was added in agarose solution under stirring condition at 70 degree Celsius followed by the addition of 40 mg naturally occurring crosslinker genipin. After that heat at 80 degree Celsius for 300 min on hot plate then gradually cooled to room (25° C.) temperature to form a hydrogel. After that, crosslinked hydrogel was cut to 0.4 mm thick slices and lyophilized at a freeze-drying temperature of −85° C. under vacuum to obtain porous foam membranes. The resulting membrane was flexible, spongy, and suitable for separation experiments.

TABLE 5

Flux rate dependency on the type of solvent mixtures.

| Type of mixture | Flux rate ($L.m^{-2} \cdot h^{-1}$) | % Oil rejection | Remarks |
| --- | --- | --- | --- |
| Crude oil-water | 260 | 98 | Not reuse |
| Edible oil-water | 250 | 98 | Not reuse |

Novel Feature of the Invention
- Recognizing that, preparation of superhydrophilic biodegradable crosslinked foam membranes using eco-friendly materials.
- Recognizing that, preparation of superhydrophilic biodegradable patible crosslinked foam membranes using natural polymers.
- Recognizing that, preparation of superhydrophilic biodegradable crosslinked foam membranes using seaweed derived polysaccharides.
- Recognizing that, preparation of superhydrophilic biodegradable crosslinked foam membranes using seaweed derived polysaccharides.

Recognizing that, preparation of superhydrophilic biodegradable crosslinked foam membranes using hybrids of natural polymers.

Recognizing that, preparation of superhydrophilic biodegradable crosslinked foam membranes using hybrids of seaweed polysaccharides and other biopolymers.

Recognizing that, preparation of superhydrophilic biodegradable cross linked foam membranes using hybrids of seaweed polysaccharides and amino polymers.

Recognizing that, preparation of superhydrophilic biodegradable crosslinked foam membranes using hybrids of seaweed polysaccharides and amino compounds.

Recognizing that, preparation of superhydrophilic biodegradable crosslinked foam membranes having porous structure.

Recognizing that, preparation of superhydrophilic biodegradable crosslinked foam membranes with the tailored porosity.

Recognizing that, preparation of superhydrophilic biodegradable crosslinked foam membranes as a substitute of conventional membrane working under high pressure for numerous applications including the separation of oil-water emulsions.

Recognizing that, preparation of superhydrophilic biodegradable crosslinked foam membranes as a substitute of conventional membrane working under high pressure for potential applications including the separation of hexane-water mixtures.

Recognizing that, preparation of superhydrophilic biodegradable crosslinked foam membranes as a substitute of conventional membrane working under high pressure for potential applications including the separation of toluene-water mixtures.

Recognizing that, preparation of superhydrophilic biodegradable crosslinked foam membranes as a substitute of conventional membrane working under high pressure for potential applications including the separation of oil spell-water mixtures.

Recognizing that, the environmental pollution arises by synthetic membranes may be harmful but the superhydrophilic biodegradable crosslinked foam membranes produced with this process will be better for the ecosystem.

Recognizing that, sterilization of the superhydrophilic biodegradable crosslinked foam membranes up to 90° C. can be done under autoclave conditions may be useful in pharmaceutical applications with required specifications.

Recognizing that, these superhydrophilic biodegradable crosslinked foam membranes can be used for making ion exchange tools/electrochemical tools/films/membranes with required specifications for the targeted applications.

Advantages of the Invention

Recognizing the fact that separations of different mixtures including oil-water mixtures and emulsions inevitably requires the use of suitable membranes and that the non-biodegradability of existing membranes can pose a serious threat where separation is undertaken on very large scale, leading to massive problem of pollution with solid waste, the present invention provides a solution to the problem by providing superhydrophilic biodegradable foam membranes which can be used for energy-efficient and eco-friendly membrane separations.

By blending amino compounds and amino polymers such as gelatin, chitosan, etc. onto the hydrophilic seaweed polysaccharides it is possible to impart stability to the prepared foam membranes without compromising excessively on their biodegradability, especially in soil.

The prepared superhydrophilic biodegradable foam membranes exhibit high thermal stability which allows them to be sterilized at high temperature for wider applications such as in pharmaceutical applications.

The prepared superhydrophilic biodegradable foam membranes exhibit stability in water up to 90 degree Celsius which may be used for wider aqueous applications such as oil-water separation.

We claim:

1. A hydrophilic biodegradable hybrid foam membrane consisting of:
    a seaweed derived polysaccharide in the range of 50 to 95 wt %, wherein the seaweed derived polysaccharide comprises at least one of agar, agarose, and carrageenan;
    an amino compound in the range of 5 to 50 wt %, wherein the amino compound comprises at least one of gelatin, chitosan, and bovine serum albumin; and
    a crosslinker in the range of 0.01 to 0.1 wt %, wherein the crosslinker comprises genipin;
wherein the hydrophilic biodegradable hybrid foam membrane has been lyophilized to have a moisture content in the range of 5 to 15 wt %.

2. A method of separating a mixture comprising an oil-water mixture and/or emulsion under ambient conditions at a flux rate in the range of 260 to 900 $L \cdot m^{-2} \cdot h^{-1}$ and an oil rejection percentage in the range of 96 to 99% comprising:
    obtaining a hydrophilic biodegradable hybrid foam membrane of claim 1; and
    using the membrane to separate the mixture.

3. A process for preparing the hydrophilic biodegradable hybrid foam membrane of claim 1, comprising:
    dissolving 0.5 to 7 wt % of a seaweed derived polysaccharide comprising at least one of agar, agarose, and carrageenan by heating at a temperature in the range of 100 to 120° C. for a period in the range of 5 to 45 minutes to obtain a homogenous solution;
    adding 0.05 to 4 wt % of an amino compound comprising at least one of gelatin, chitosan, and bovine serumalbumin dissolved in water to the homogenous solution at a temperature in the range of 40 to 85° C. under constant stirring for a period in the range of 1 to 60 minutes to obtain a reaction mixture;
    adding 0.01 to 1.0 wt % of genipin with respect to the reaction mixture and keeping the reaction mixture at a temperature in the range of 25 to 80° C. for a period in the range of 20 min to 12 days to obtain a crosslinked hydrogel; and
    slicing the crosslinked hydrogel and lyophilizing it for a period in the range of 10 to 40 hours to obtain a hydrophilic biodegradable hybrid foam membrane.

4. The process of claim 3, wherein the crosslinking is done in a bulk hydrogel having a thickness in the range of 5 cm to 50 cm or in a hydrogel cast in a thin layer of thickness 0.2 cm to 2 cm.

* * * * *